US011174041B2

(12) United States Patent
Gonzalez et al.

(10) Patent No.: US 11,174,041 B2
(45) Date of Patent: Nov. 16, 2021

(54) SYSTEMS AND METHODS FOR DETERMINING FASTENERS

(71) Applicant: The Boeing Company, Chicago, IL (US)

(72) Inventors: Luis Rogelio Gonzalez, Everett, WA (US); Peter Hoang Bui, Lynnwood, WA (US); Aksel Bode, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 613 days.

(21) Appl. No.: 16/009,122

(22) Filed: Jun. 14, 2018

(65) Prior Publication Data

US 2019/0382135 A1    Dec. 19, 2019

(51) Int. Cl.
| | |
|---|---|
| *B64F 5/10* | (2017.01) |
| *B64C 1/26* | (2006.01) |
| *G01B 7/00* | (2006.01) |
| *B23P 19/12* | (2006.01) |

(52) U.S. Cl.
CPC ............... *B64F 5/10* (2017.01); *B23P 19/12* (2013.01); *B64C 1/26* (2013.01); *G01B 7/003* (2013.01); *B23P 2700/01* (2013.01)

(58) Field of Classification Search
CPC ... B64F 5/10; B64C 1/26; G01B 7/003; B23P 19/12; B23P 2700/01; G05B 2219/32359
See application file for complete search history.

(56) References Cited

U.S. PATENT DOCUMENTS

| | | | |
|---|---|---|---|
| 7,756,321 B2 | 7/2010 | Marsh et al. | |
| 2008/0111813 A1* | 5/2008 | Gatzke | G05B 19/41805 345/419 |
| 2010/0009113 A1* | 1/2010 | Desrosiers | B29C 45/14508 428/99 |
| 2014/0196289 A1* | 7/2014 | Hollingshead | B64F 5/10 29/897.2 |
| 2017/0132355 A1* | 5/2017 | Vasquez | B64C 1/26 |

* cited by examiner

*Primary Examiner* — Regis J Betsch
*Assistant Examiner* — Jeremy A Delozier
(74) *Attorney, Agent, or Firm* — Kolisch Hartwell, P.C.

(57) ABSTRACT

Systems and methods are used to determine a defined fastener for fastening two parts together at an assembly fastener location. The defined fastener comprises fastener components selected from a plurality of different fastener components available for use in an assembled fastener. The fastener components of the defined fastener may be selected based on criteria defining characteristics of an assembly stackup including the two parts and the assembled defined fastener. Dimensions of the two parts at respective fastener locations forming the assembly fastener location may be used to determine a part stackup dimension for the assembled fastener at the assembly fastener location.

20 Claims, 9 Drawing Sheets

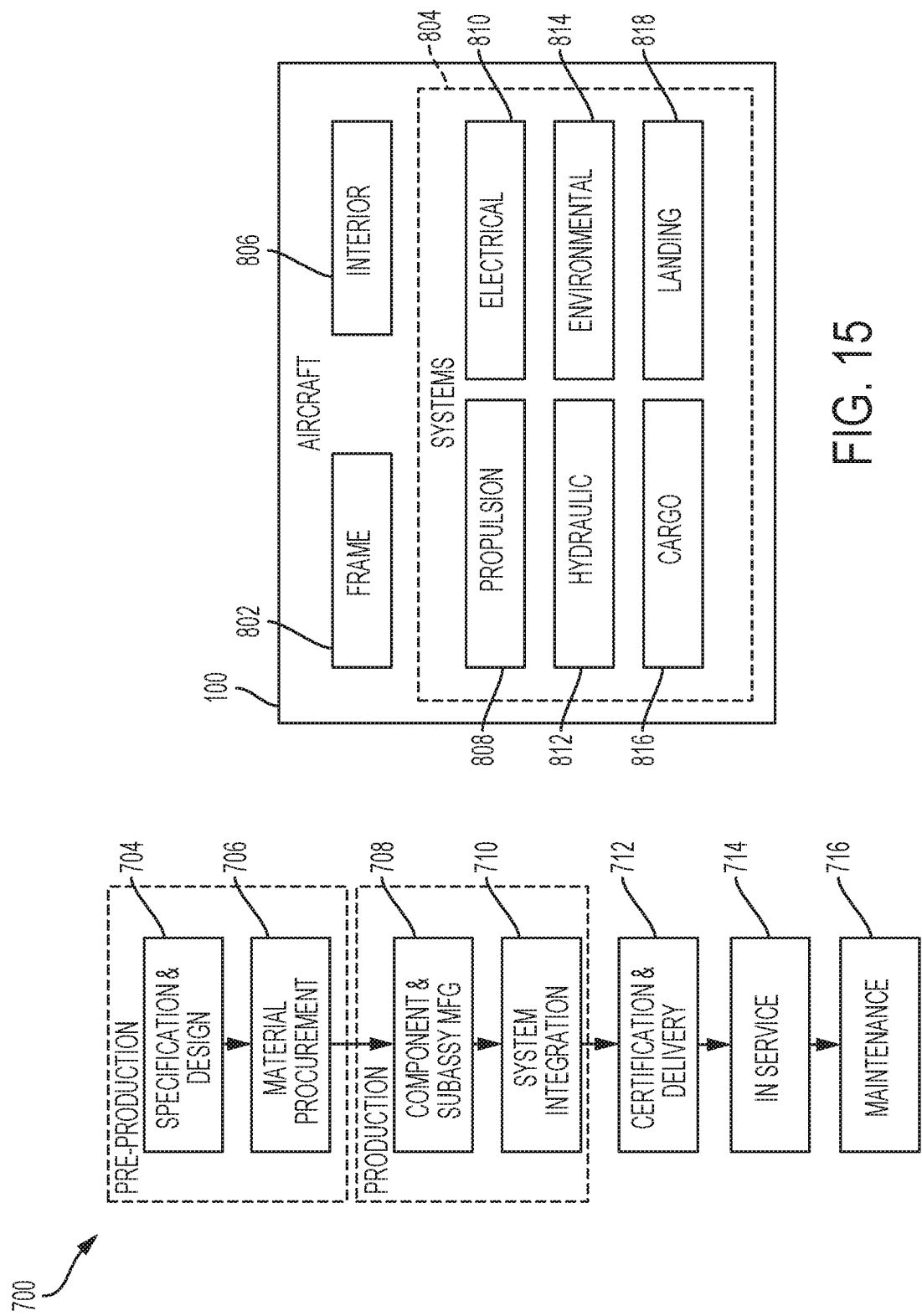

SYSTEMS AND METHODS FOR DETERMINING FASTENERS

FIELD

This disclosure relates to systems and methods for joining parts. More specifically, the disclosed embodiments relate to determining fasteners to join parts, especially during the assembly of large structures such as aircraft.

INTRODUCTION

Manufacturing an aircraft or other structure may include joining parts together at one or more fastening locations using fasteners assembled from one or more components (e.g., bolts, nuts, washers, etc.). At each fastening location, dimensions of the assembled fastener and the parts to be joined may need to satisfy one or more criteria to ensure that the assembled fastener joins the parts securely. However, actual dimensions of the parts and the fastener components typically vary from the nominal design dimensions within certain tolerances, and the accumulated dimensional variations of the entire stackup may be significant. As a result, assembled fasteners at two nominally similar fastening locations may require different fastener components (e.g., bolts of different grip length) in order to satisfy the criteria. In known assembly systems, the necessary fastener components cannot be identified until the parts are positioned together and the dimensions of the aligned assembly fastener locations are measured. Mechanics joining the parts must measure each assembly fastener location individually and select appropriate fastener components based on the measured dimensions.

SUMMARY

The present disclosure provides systems, apparatuses, and methods relating to determining fasteners suitable for joining parts. In some embodiments, a method for fastening two parts together comprises, prior to joining a first part with a second part, obtaining dimensions of the first part and the second part at respective fastener locations forming an assembly fastener location of an assembly of the first part joined with the second part where the first part is to be fastened to the second part by an assembled fastener; determining, based on the dimensions of the first and second parts at the respective fastener locations, a part stackup dimension for the assembled fastener at the assembly fastener location including a first dimension of the first part and a second dimension of the second part; obtaining dimensions of each of a plurality of different fastener components available for use in the assembled fastener; obtaining criteria defining characteristics of an assembly stackup including the first and second parts and the assembled fastener; and determining a defined fastener satisfying the criteria and having fastener components selected from the plurality of different fastener components.

In some embodiments, a data processing system for identifying fastener components comprises one or more processors; a memory including one or more digital storage devices; and a plurality of instructions stored in the memory and executable by the one or more processors to store data representing dimensions of a first part and a second part at respective fastener locations forming an assembly fastener location of an assembly of the first part joined with the second part where the first part is to be fastened to the second part by an assembled fastener; determine, based on the stored data, a part stackup dimension for the assembled fastener at the assembly fastener location including a first dimension of the first part and a second dimension of the second part; identify dimensions of each of a plurality of different fastener components available for use in the assembled fastener; receive criteria defining characteristics of an assembly stackup at the respective fastener locations on the first part and the second part including the first and second parts and the assembled fastener; and determine a defined fastener satisfying the criteria and having fastener components selected from the plurality of different fastener components.

In some embodiments, a computer program product for defining a fastener comprises a non-transitory computer-readable storage medium having computer-readable program code embodied therewith, the computer-readable program code configured to cause a data processing system to define the fastener, the computer-readable program code comprising at least one instruction to store data representing dimensions of a first part and a second part at respective fastener locations forming an assembly fastener location of an assembly of the first part joined with the second part where the first part is to be fastened to the second part by an assembled fastener; at least one instruction to determine, based on the stored data, a part stackup dimension for the assembled fastener including a first dimension of the first part and a second dimension of the second part; at least one instruction to identify dimensions of each of a plurality of different fastener components available for use in the assembled fastener; at least one instruction to receive criteria defining characteristics of an assembly stackup at the respective fastener locations on the first part and the second part including the first and second parts and the assembled fastener; and at least one instruction to determine a defined fastener satisfying the criteria and having fastener components selected from the plurality of different fastener components.

In some embodiments, a method of defining fasteners for joining parts of an aircraft comprises measuring locations of a first set of features of a first aircraft part; measuring locations of a second set of features of a second aircraft part; generating a virtual fit between the first and second aircraft parts based on the measured locations; and determining, based on the virtual fit, characteristics of one or more fasteners to secure the first aircraft part to the second aircraft part at respective fastener sites within the first and second aircraft parts.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 14 is a flow diagram depicting steps in an illustrative aircraft manufacturing and service method.

FIG. 15 is a schematic diagram depicting systems of an illustrative aircraft.

DETAILED DESCRIPTION

Figure 1:
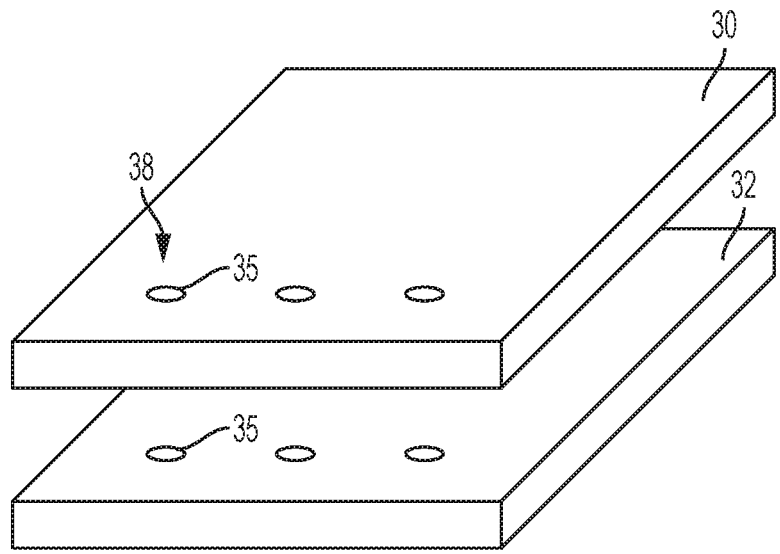
FIG. 1 is a schematic depiction of two illustrative parts to be fastened together at respective fastener locations.

Various aspects and examples of fastener determining systems and methods are described below and illustrated in the associated drawings. Unless otherwise specified, a fastener determining system, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein may be included in other similar devices and methods, including being interchangeable between disclosed embodiments. The following description of various examples is merely illustrative in nature and is in no way intended to limit the examples, their applications, or their uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Illustrative Combinations and Additional Examples; (5) Advantages, Features, and Benefits; and (6) Conclusion. The Examples, Components, and Alternatives section is further divided into subsections A through H, each of which is labeled accordingly.

Definitions

The following definitions apply herein, unless otherwise indicated.

"Substantially" means to be predominantly conforming to the particular dimension, range, shape, concept, or other aspect modified by the term, such that a feature or component need not conform exactly, so long as it is suitable for its intended purpose or function. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, in the order they are introduced in a particular context and are not intended to show serial or numerical limitation, or be fixed identifiers for the group members.

The terms "inboard," "outboard," "forward," and "aft" (and the like) are intended to be understood in the context of a host vehicle on which systems described herein may be mounted or otherwise attached. For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, "forward" means toward the front portion of the vehicle, and "aft" means toward the rear of the vehicle. In the absence of a host vehicle, the same directional terms may be used as if the vehicle were present. For example, even when viewed in isolation, a crossbar may have a "forward" edge, based on the fact that the crossbar would be installed with the edge in question facing in the direction of the front portion of the host vehicle.

"Coupled" means to be in such relation that the performance of one influences the performance of the other, may include being connected, either permanently or releasably, whether directly or indirectly through intervening components, and is not necessarily limited to physical connection(s).

Overview

In general, systems and methods described below are configured to determine a fastener suitable to fasten two or more parts together at a specific fastening site. The fastener may be determined according to one or more fastening criteria, based on the dimensions of fastener components of the determined fastener and of the parts to be joined.

FIG. 1 depicts a first illustrative part 30 and a second illustrative part 32 to be fastened together. Although parts 30 and 32 are depicted as rectangular prisms in FIG. 1 for illustrative purposes, they may each have any shape suitable for fastening to the other at one or more locations, and they may be shaped and/or sized differently. Parts 30 and 32 each include at least one fastener location 35 (also called a fastening location and/or a fastener site) where a fastener is to be installed to join the two parts together. Typically, each fastener location 35 on part 30 corresponds to a fastener location 35 on part 32, and the corresponding fastener locations are aligned with each other when the two parts are brought together (e.g., fitted together) so that the fasteners may be installed.

A pair of aligned fastener locations 35 may be referred to as an assembly fastener location 38. In some examples, fastener locations 35 comprise bores which are aligned when parts 30 and 32 are fitted together, such that assembly fastener location 38 comprises a continuous bore through both parts. A bolt may pass through the continuous bore of assembly fastener location 38 to join parts 30 and 32 at the assembly fastener location. Additionally, or alternatively, fastener locations 35 may comprise threaded holes, rivet holes, countersinks, or simply a location where a fastener may be attached to the two parts to hold the two parts together.

Figure 2:
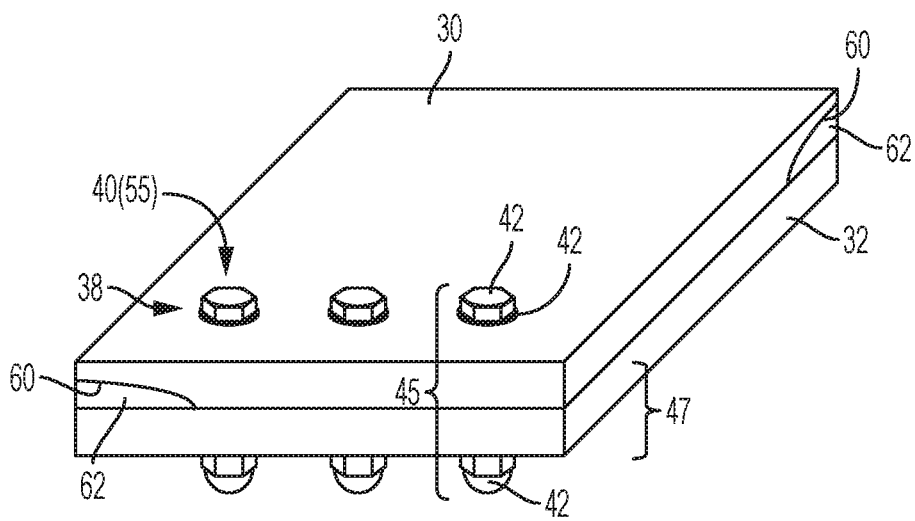
FIG. 2 is a schematic depiction of two illustrative parts fastened together with assembled fasteners at assembly fastener locations.

FIG. 2 depicts parts 30 and 32 fitted together and fastened together at a plurality of assembly fastener locations 38 using respective fasteners 40. Each fastener 40 comprises at least one fastener component 42. In the example depicted in FIG. 2, fastener components 42 include a bolt, a washer, and a nut. Additional examples of fastener component 42 may include sleeves, screws, buckles, buttons, ties, clamps, clasps, flanges, grommets, hooks, latches, nails, pins, retaining rings, rivets, anchors, staples, straps, clips, clamps, and the like. Installing fastener components 42 at one of the assembly fastener locations 38 may be described as assembling fastener 40. Accordingly, fastener 40 may also be referred to as an assembled fastener 40 when installed on the parts being joined. First part 30, second part 32, and any other parts being joined with the first and second parts, together with an assembled fastener 40 joining them together, may be referred to as an assembly stackup 45.

Typically, fastener components 42 are manufactured to have predetermined nominal dimensions. Due to uncertainty in the manufacturing process, the actual dimensions of each fastener component 42 differ from the nominal dimensions by at least a certain amount determined by manufacturing tolerances. For example, the actual value of a fastener component dimension may be a value within a predetermined tolerance of a nominal value. Similarly, parts 30 and 32 may have actual dimensions equal to a value within predetermined tolerances of respective nominal values. When parts 30 and 32 are aligned and joined with an assembled fastener 40, the differences between the actual and nominal dimensions of all of the fastener components 42 and parts 30 and 32 (e.g., of assembly stackup 45) can add up to a significant value. The actual dimensions of assembly stackup 45 can therefore vary significantly between assembly fastening locations 38 having the same nominal part dimensions. As a result of this variation, a given fastener 40 having fastener components 42 dimensioned to securely join parts 30 and 32 at a first one of the assembly fastener locations 38 may not be dimensioned to securely join the parts at a second one of the assembly fastener locations, even though the first and second assembly fastener locations have the same nominal dimensions.

Systems and methods described below allow for obtaining dimensions of parts 30 and 32 (e.g., at respective fastener locations 35) and determining, for each assembly fastener location 38, a defined fastener 55 having specific fastener components 42 selected to securely fasten the parts. Actual dimensions of parts 30 and 32 may be determined by, e.g., measuring the parts at respective fastener locations 35. Additionally, or alternatively, nominal design dimensions and manufacturing tolerances of parts 30 and 32 at fastener locations 35 may be obtained. In some examples, dimensions of parts 30 and 32 at respective fastener locations 35 are obtained by obtaining dimensions of the two parts, obtaining information specifying the respective fastener locations on the two parts, and determining the dimensions of the two parts at the respective fastener locations based on the dimensions of the two parts and the information specifying the fastener locations.

A dimension for a part stackup 47 for assembled fastener 40 at assembly fastener location 38 may be determined based on the dimensions of the parts being joined, such as parts 30 and 32 at respective fastener locations 35. The part stackup dimension includes at least a first dimension of the first part and a second dimension of the second part. The first and second dimensions may be, e.g., thicknesses of the first and second parts 30 and 32.

Fastener components 42 for defined fastener 55 may be selected from a supply or inventory including a plurality of different fastener components available for use in fasteners 40. For example, the plurality of different fastener components may include washers having different thicknesses, hole diameters, and outer edge configurations and dimensions; bolts having different grip lengths, thread lengths, thread density, diameter, and head configuration and size; and so on. Fastener components 42 for defined fastener 55 may be chosen (e.g., selected from the plurality of different available components) such that a combination of components forming the defined fastener at the selected assembly fastener location 38 satisfy one or more criteria associated with a secure fastening. The criteria may define characteristics of assembly stackup 45. Illustrative criteria are discussed below in subsections A and B with reference to illustrative fastener components 42.

In some examples, defined fastener 55 is determined based on actual dimensions of parts 30 and 32. For example, respective fastening locations 35 on each part may be measured to determine the actual dimensions of the fastening locations. In some examples, defined fastener 55 may be determined based on the nominal dimensions and tolerances of parts 30 and 32 and/or one or more fastener components 42 of assembled fastener 40. For example, a first prospective defined fastener may be determined based on nominal dimensions of parts 30 and 32 (and/or fastener components 42) and on a first estimate of the accumulated tolerances of the parts and fastener components. A second prospective defined fastener may be determined based on the same nominal dimensions and on a second estimate of the accumulated tolerances, and so on. One of the prospective defined fasteners may be selected as defined fastener 55 based on, e.g., the probability that the associated estimate of the accumulated tolerances is accurate, or they may all be considered a set of alternative defined fasteners. For example, an estimate that assumes that the actual dimensions of the parts and fastener components are all very close to the nominal values may be more accurate than an estimate that assumes that the actual dimensions are all very far from the nominal values. Accordingly, the prospective defined fastener determined based on the estimate more likely to be accurate would be selected as the defined fastener.

A virtual fit between parts 30 and 32 at one or more fastener locations 35 and/or assembly fastener locations 38 may be generated based on the obtained dimensions of the parts. Generating the virtual fit may include using data representing three-dimensional (3D) surface profiles of parts 30 and 32 to simulate the fit between the two parts. Three-dimensional surface profiles may be, e.g., digital representations of the physical surface geometry of parts 30 and 32. The 3D surface profiles of parts 30 and 32 are arranged to form a virtual fit consistent with mating the two parts (e.g., with no interference between portions of the two parts). Virtually fitting parts 30 and 32 may include importing the 3D surface profiles into a 3D model manipulation program, such as a computer-aided design (CAD) program, and optimizing the relative positions of the 3D surface profiles until a desired fit is achieved. Performing the virtual fit may include identifying features within the 3D surface profiles and aligning those features according to engineering and/or aerodynamic considerations.

The virtual fit may define one or more gaps 60 between parts 30 and 32 when the parts are virtually fitted together.

When parts 30 and 32 are physically put together in a real fit so that they may be fastened together, it may be beneficial to fill gaps 60 with one or more shims 62 to increase the structural integrity of the joint and/or to modify the alignment of the two parts. The dimensions of shims 62 configured to fill gaps 60 may be determined (e.g., predicted) based on the virtual fit. Accordingly, shims 62 having the appropriate dimensions may be manufactured (e.g., using a CNC machining center) prior to physically fitting parts 30 and 32 in a real fit. Additionally, or alternatively, shims 62 having the appropriate dimensions may be obtained from a supply of available shims having a variety of dimensions. In examples wherein shims 62 are positioned between parts 30 and 32, the part stackup dimension for fastener 40 at assembly fastener location 38 includes at least one dimension for each shim positioned at or adjacent the assembly fastener location.

Parts 30 and 32 may be assembled in a real fit, with first part 30 positioned relative to second part 32 with respective fastener locations 35 aligned, and fastened together by installing a defined fastener 55 at each assembly fastener location 38. One or more shims 62 having the determined shim dimensions may be installed at or adjacent assembly fastener locations 38, or at other positions between parts 30 and 32. As discussed further below with reference to FIG. 11, a diagram illustrating a structure of the assembly of parts 30 and 32 may be generated to aid in joining the parts with the correct defined fasteners 55. Consulting the diagram may make the process of joining parts 30 and 32 faster and/or more efficient.

Figure 3:
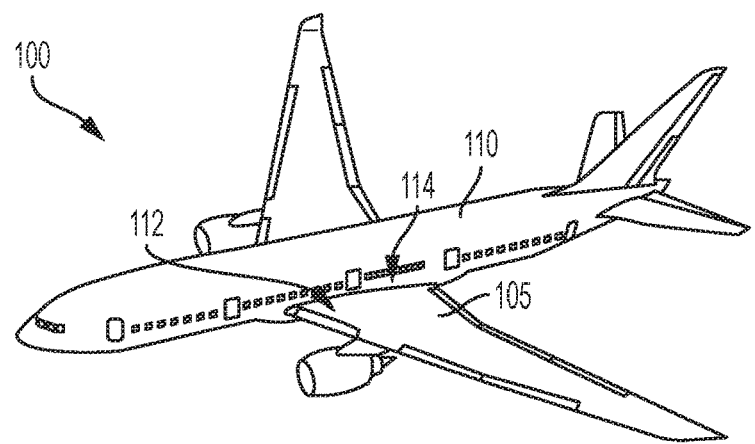
FIG. 3 is an isometric view of an illustrative aircraft, which may be assembled by joining parts with fasteners.
Figure 4:
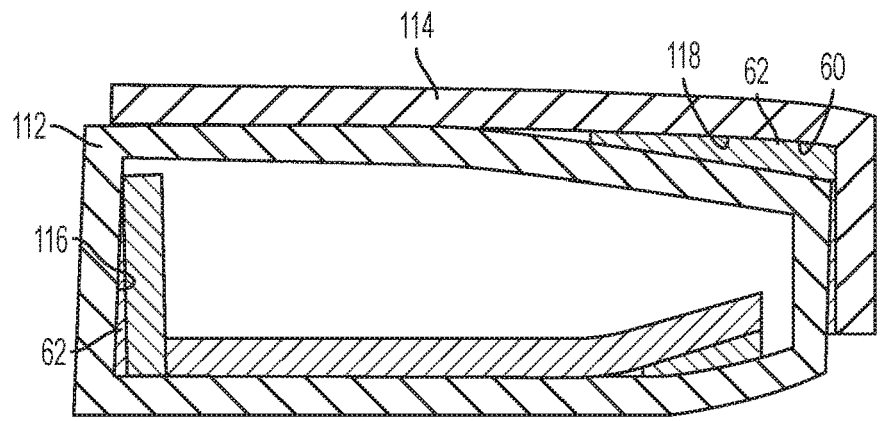
FIG. 4 is a simplified cross-sectional view of an illustrative aircraft wing stub and illustrative aircraft wing root positioned together, with illustrative shims filling gaps defined by the wing stub and wing root.

In some examples, parts 30 and 32 are components of an aircraft 100, shown in FIG. 3. For example, the systems and methods described herein may be used to join an aircraft wing 105 to an aircraft fuselage 110 (or to a portion thereof). Typically, wing 105 includes a wing root 112, and fuselage 110 includes a wing stub 114, a simplified example of which is illustrated in FIG. 4. Wing root 112 and wing stub 114 are interfaces of wing 105 and fuselage 110, respectively, and are configured to mate together at one or more wing root interface surfaces 116 and one or more wing stub interface surfaces 118. FIG. 4 is a cross-sectional view depicting wing root 112 mated with wing stub 114. Typically, one or more gaps 60 are defined between wing root interface surfaces 116 and wing stub interface surfaces 118.

Figure 5:
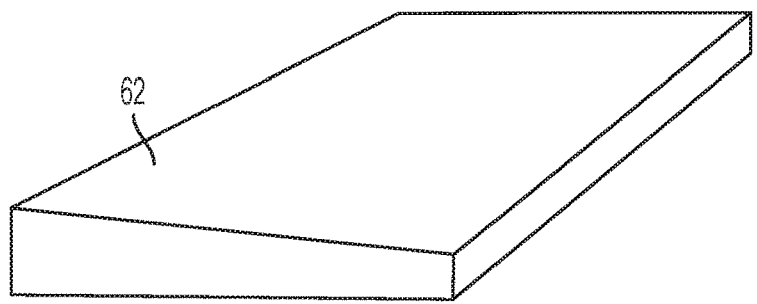
FIG. 5 is an isometric view of one of the shims depicted in FIG. 4.

Gaps 60 may be predicted based on dimensions of wing 105 and fuselage 110 determined from a virtual fit between the wing and fuselage. The dimensions may be obtained from measurements of wing 105 and fuselage 110 and/or from data associated with nominal parameters of the wing and fuselage, such as design dimensions and manufacturing tolerances of the wing and fuselage. Nominal parameters and/or tolerances of any fastener components 42 to be used to fasten the wing and fuselage together may also be used to obtain dimensions for fasteners. The virtual fit is also used to calculate dimensions of shims 62 sized and shaped to substantially fill gaps 60. FIG. 5 depicts an illustrative shim 62 having a rectangular footprint and wedge-shaped cross-section. In other examples, shim 62 may be rectangular in cross-section, and/or may take another shape determined by the shape of the gap into which it is to be placed.

In some cases, the virtual fit indicates that the relative positions of wing root 112 and wing stub 114 may be adjusted slightly when the root and stub are fitted together (i.e., the root and stub have some play when fitted together). Correspondingly, the sizes and shapes of gaps 60 defined by the root and stub may vary based on the desired position of the root and stub within the fit. Accordingly, in these cases the virtual fit indicates that multiple different sets of shims 62 have dimensions suitable to substantially fill gaps 60. A set of shims 62 to be used when wing 105 and fuselage 110 are assembled together in a real fit may be selected based on criteria associated with a high structural integrity and/or aerodynamic performance of aircraft 100. For example, shims 62 may be selected to achieve a desired wing inclination, sweep, and/or dihedral angle. The dimensions of wing 105, fuselage 110, and shims 62 may be used to determine fastener components 42 of defined fasteners 55 configured to fasten the wing to the fuselage at one or more assembly fastener locations 38.

Although FIGS. 3 and 4 and descriptions thereof refer to the assembly of an aircraft 100, systems and methods described herein may also be used to assemble other suitable large structures (e.g., buildings, watercraft, manufacturing equipment, and/or the like), or to join any suitable parts.

Technical solutions are disclosed herein for manufacturing processes used to join parts. Specifically, the disclosed systems and methods address a technical problem tied to mechanical fasteners and arising in the realm of manufacturing technology, namely the technical problem of securely fastening parts together in the presence of tolerance stackup, i.e., variation in the part stackup dimension due to cumulative manufacturing tolerances. The systems and methods disclosed herein solves this technical problem by determining fastener components dimensioned to fasten parts together according to one or more criteria. Accordingly, the systems and methods disclosed herein provide a technical solution to a technological problem and improve manufacturing technology, especially technology related to mechanical fasteners.

Aspects of the fastener prediction systems and methods may be embodied as a computer method, computer system, or computer program product. For example, nominal dimensions and/or tolerances of parts 30 and 32 and/or fastener components 42 may be received using a computer. Data representing dimensions of the plurality of different fastener components 42 available for use in fastener 40 may be received from a database including data associated with the different fastener components. Criteria defining characteristics of assembly stackup 45 may be input into a computer by a user and/or retrieved from a database by the computer. The virtual fit may be performed on a computer. Dimensions of the first and second parts 30 and 32 may be measured by an electronic sensing device coupled to a computer. Accordingly, aspects of fastener determining systems and methods may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the fastener prediction system may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, radio frequency (RF), and/or the like, and/or any suitable combination of these.

Computer program code for carrying out operations for aspects of the fastener prediction system may be written in one or any combination of programming languages, including an object-oriented programming language such as Java, Smalltalk, C++, and/or the like, and conventional procedural programming languages, such as C. Mobile apps may be developed using any suitable language, including those previously mentioned, as well as Objective-C, Swift, C#, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the fastener prediction system are described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block(s). In some examples, machine-readable instructions may be programmed onto a programmable logic device, such as a field programmable gate array (FPGA).

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block(s).

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the fastener prediction system. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

In light of the above description, the term "processing logic" may be utilized to include any suitable device or hardware configured to process data by performing one or more logical and/or arithmetic operations (e.g., executing coded instructions). For example, processing logic may include one or more processors (e.g., central processing units (CPU) and/or graphics processing units (GPU)), microprocessors, clusters of processing cores, FPGAs (field-programmable gate arrays), artificial intelligence (AI) accelerators, digital signal processors, and/or any other suitable combination of logic hardware.

Examples, Components, and Alternatives

The following sections describe selected aspects of exemplary fastener prediction systems, as well as related systems and/or methods. The examples in these sections are intended for illustration and should not be interpreted as limiting the entire scope of the present disclosure. Each section may include one or more distinct embodiments or examples, and/or contextual or related information, function, and/or structure.

A. Illustrative Bolt Assembly and Criteria

Figure 6:
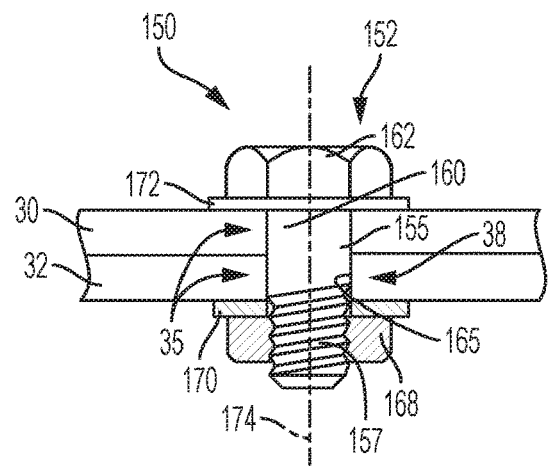
FIG. 6 is a side view of an illustrative bolt assembly joining two parts.
Figure 7:
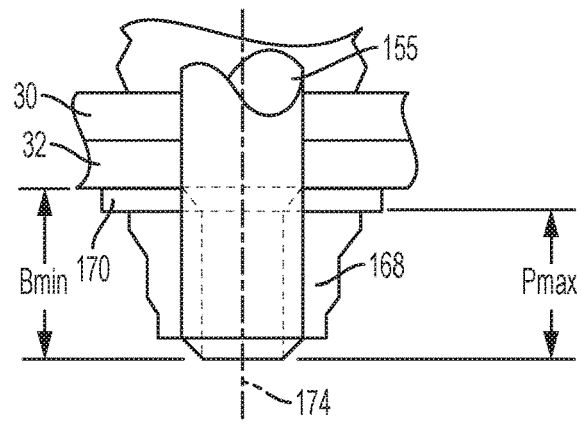
FIG. 7 is a schematic diagram depicting illustrative parameters used to determine fastener components of a defined fastener.

As shown in FIGS. 6 and 7, this section describes an illustrative bolt assembly 150. Bolt assembly 150 is an example of fastener 40, described above.

Bolt assembly 150 includes a plurality of bolt assembly components 152. Bolt assembly components 152 are examples of fastener components 42. Bolt assembly components 152 include a bolt 155 having a threaded portion 157, an unthreaded grip portion 160, and a bolt head 162. As depicted in FIG. 6, bolt assembly 150 may be used to join parts 30 and 32 at an assembly fastener location 38 comprising a bore 165 extending through the two parts. Bore 165 is formed by respective bores at respective fastener locations 35 on parts 30 and 32. Bolt assembly 150 may further include a nut 168 threadedly mounted to bolt 155, and typically includes a nut-side washer 170 and/or a head-side washer 172. In some examples, nut-side washer 170 and/or head-side washer 172 are omitted. In some examples, two or more nut-side washers 170 and/or two or more head-side washers 172 are present. For simplicity, the following description refers to a single nut-side washer 170 and a single head-side washer 172.

In context of bolt assembly 150, a central axis 174 of bolt 155 defines an upward direction toward bolt head 162 and a downward direction toward an end of threaded portion 157 distal head 162 as viewed in FIG. 6. For example, head-side washer 172 may be described as having an upper surface (also called a top surface facing the bolt head) engaging bolt head 162 and a lower surface (also called a bottom surface facing away from the bolt head) engaging first part 30. Unless otherwise specified, these definitions apply irrespective of the orientation of the central axis of bolt 155 relative to the ground, the direction of gravity, and/or any other external frame of reference.

During assembly of bolt assembly 150 from bolt assembly components 152, some or all of the bolt assembly components may be selected from a plurality of different bolt assembly components having different dimensions, configurations, and/or types. For example, a plurality of different bolts 155 may be available for use in bolt assembly 150, with each bolt having different dimensions or characteristics, such as different thread densities, different diameters, different head configurations, and grip portions 160 having different lengths. A plurality of nut-side washers and head-side washers 172 each having different thicknesses, shapes, inner diameters, and/or outer diameters may be available; different types or configurations of washers (e.g., plain washers, spring washers, captive washers, and/or locking washers) may also be available for use. Similarly, a plurality of different nuts 168 having different dimensions and/or types (e.g., plain nuts, castle nuts, self-locking nuts, wing nuts, sleeve-bolt nuts, and/or acorn nuts) may be available for use. Specialized bolt assembly components 152 having different dimensions, forms, and/or types may be available for specific applications. For example, bolt assembly components 152 of the "AN" (Army-Navy), "MS" (Mil-Spec) and/or "NAS" (National Aerospace Standard) types may be used to fasten together parts of an aircraft.

The ability of bolt assembly 150 to securely fasten parts 30 and 32 together may depend on one or more characteristics of assembly stackup 45 including the first and second parts and the bolt assembly. These characteristics may be associated with, e.g., the engagement between two or more bolt assembly components 152 and/or between a bolt assembly component and part 30 and/or part 32. One or more criteria defining characteristics of assembly stackup 45 may be used to guide the selection of bolt assembly components 152 to be used to join parts 30 and 32 at a given assembly fastener location 38.

A first illustrative criterion is that threaded portion 157 of bolt 155 is positioned entirely externally of bore 165. If, in violation of the first criterion, threaded portion 157 were positioned within bore 165, vibration of assembly stackup 45 could cause the threads of the threaded portion to ream the bore and thereby reduce the strength and/or usable lifetime of the joint. Accordingly, the first criterion may be important if parts 30 and 32 are components of an aircraft or other structure prone to vibration (due to, e.g., the action of an engine and/or motor, the presence of moving parts, and/or air turbulence). An assembly stackup 45 that violates the first criterion may be described as having "threads in the bearing." Characteristics of bolt assembly components 152 at least partially determining whether the first criterion is satisfied may include the length of grip portion 160, the presence or absence of head-side washer 172, and the thickness of head-side washer 172 if present. Associated characteristics of assembly stackup 45 may include the total length extending from head 162 at the top, head-facing surface of head-side washer 172 to the bottom of grip portion 160 adjacent thread portion 157, and the total length of the part stackup extending from the top or outer surface of first part 30 to the opposite bottom or outer surface of second part 32.

In some examples, the first criterion may be that no more than a certain number of threads of threaded portion 157 are positioned within bore 165. For example, the first criterion may be that no more than two threads are positioned within bore 165, such that the first criterion is satisfied if a portion of threaded portion 157 including two threads or fewer is positioned within the bore.

A second illustrative criterion is that threaded portion 157 extends beyond nut 168 by at least a first amount. The second criterion helps to ensure that nut 168 properly engages threaded portion 157, such that, for example, tension within bolt 155 is transferred to the nut. Characteristics of bolt assembly components 152 at least partially determining whether the second criterion is satisfied may include the length of grip portion 160, the length of threaded portion 157, the thickness of nut 168, the presence or absence of nut-side washer 170 and/or head-side washer 172, and the respective thicknesses of the nut-side washer and head-side washer, if present. Associated characteristics of assembly stackup 45 may include the total length extending from head 162 at the top or head-facing surface of head-side washer 172 to the bottom or distal surface of nut 168 (including the length extending from the top or outer surface of first part 30 to the opposite bottom or outer surface of second part 32), and the total or combined length of grip portion 160 and threaded portion 157.

The first amount that threaded portion 157 extends beyond nut 168 may be expressed as a number of threads protruding beyond the nut, e.g., one thread, one and a half threads, two threads, and so on. If threaded portion 157 terminates in a frustoconical chamfer portion distal bolt head 162, the second criterion may be that the chamfer portion extend beyond nut 168 by at least a certain amount.

A third illustrative criterion is that grip portion 160 extend beyond second part 32 (or beyond nut-side washer 170, if present) by no more than a second amount. The third criterion helps to ensure that nut 168 engages second part 32 (or nut-side washer 170, if present) while mounted entirely on threaded portion 157. If the third criterion is not satisfied, then parts 30 and 32 may not be securely fastened together (e.g., the first and second parts may be able to move relative to each other). When the third criterion is not satisfied, nut 168 may be described as "bottomed out." Characteristics of bolt assembly components 152 at least partially determining whether the third criterion is satisfied may include the length of grip portion 160, the presence or absence of nut-side washer 170 and/or head-side washer 172, and the respective thicknesses of the nut-side washer and head-side washer, if present. Associated characteristics of assembly stackup 45 may include the length extending from the top side of head-side washer 172 to the bottom of grip portion 160, and the length extending from the top side of first part 30 to the bottom side of second part 32 (or to the bottom side of nut-side washer 170, if present). The second amount may be expressed as a length, e.g., in millimeters and/or mils.

A fourth illustrative criterion is that threaded portion 157 extend beyond nut 168 by less than a third amount. If, in violation of the fourth criterion, threaded portion 157 extended beyond nut 168 by more than the third amount, then the threaded portion may be so long that it interferes with other components of the assembly comprising parts 30 and 32. In some examples, the monetary cost of bolt 155 increases with the length of the bolt, and therefore a bolt long enough to extend beyond nut 168 by more than the third amount may not be cost-effective. Characteristics of bolt assembly components 152 at least partially determining whether the fourth criterion is satisfied may include the length of grip portion 160, the length of threaded portion 157, the thickness of nut 168, the presence or absence of nut-side washer 170 and/or head-side washer 172, and the respective thicknesses of the nut-side washer and head-side washer, if present. Associated characteristics of assembly stackup 45 may include the total length extending from the top of head-side washer 172 to the bottom of nut 168 (including the length extending from the top of first part 30 to the bottom of second part 32), and the total length of grip portion 160 and threaded portion 157. The third amount may be expressed as a number of threads protruding beyond nut 168.

The following paragraphs express criteria defining characteristics of assembly stackup 45 in terms of maximum and minimum lengths of certain portions and/or components of bolt assembly 150.

In some examples, the criteria defining characteristics of assembly stackup 45 may be defined using the following mathematical relationships. The maximum and minimum suitable lengths of bolt 155 (defined as the distance from the bottom of head 162 adjacent to grip portion 160 to the bottom or distal end of threaded portion 157) are labeled in the following equations as maxLength and minLength respectively. The maximum and minimum suitable lengths maxLength and minLength are defined as:

$$\text{maxLength} = \text{headWashers} + \text{stack} + \text{nutWasher} + p\text{Max}$$

$$\text{minLength} = \text{headWashers} + \text{stack} + b\text{Min}.$$

In these equations, headWashers is the total thickness of head-side washer(s) 172, stack is the distance from the top, outer surface of first part 30 to the bottom, outer surface of second part 32, i.e., the combined thickness of parts 30 and 32 and any associated shims, at the given assembly fastener location 38; and nutWasher is the total thickness of nut-side washer(s) 170. The longest suitable bolt 155 will have a grip portion 160 having a length equal to the sum of headWashers, stack, and nutWasher. FIG. 7 illustrates the quantities pMax and bMin. The quantity pMax is the maximum bolt protrusion to avoid bottoming out the nut, and includes the length of threaded portion 157 and a maximum additional grip length of grip portion 160. If the maximum additional grip length is exceeded, then nut 168 may bottom out because grip portion 160 is too long (e.g., the third criterion will be violated). The shortest suitable bolt 155 will have a grip portion 160 having a length equal to the sum of headWashers and stack. The quantity bMin is the minimum bolt protrusion required to ensure no threads are bearing (in the part stackup bore) and includes the length of threaded portion 157 and a minimum additional grip length of grip portion 160. If the minimum additional grip length is not met, then too many threads of threaded portion 157 will be positioned within bore 165 (e.g., the first criterion is not met). The quantities pMax and bMin define a range of acceptable lengths of the protrusion of the bolt threaded end beyond the grip portion, and selection of a nut may be based on tolerance stackup in the dimensions stack, headWashers, and nutWasher as well as nominal dimensions of the bolt assembly components. The values of pMax and bMin may be determined based on specific properties of a given application, fastener type, and/or assembly fastener site 38. For example, the values of pMax and bMin may be determined based on the required relationships of parts 30 and 32, head-side washer(s) 172, nut-side washer(s) 170, as well as length of the grip portion.

Given the maximum and minimum suitable lengths of bolt 155 for various fastener component combinations, the maximum and minimum suitable lengths of grip portion 160 (referred to as maxGrip and minGrip respectively) may be determined by the following relationships:

$$\text{maxGrip} = (\text{maxLength} - TL)$$

$$\text{minGrip} = (\text{minLength} - TL)$$

where TL is the length of threaded portion 157. A bolt 155 having threaded portion 157 having length TL and grip portion 160 having length no less than minGrip and no greater than maxGrip satisfies the first and third criteria for adequately fastening parts 30 and 32 at the assembly fastener location 38. A bolt 155 or bolt and washer combination having the identified threaded length and grip length may be selected from, e.g., a supply of available bolts having different lengths.

In some examples, the available bolts are labeled by a grip length number, and the grip length number may be determined by dividing the total thickness of the parts being joined (e.g., parts 30 and 32), including any shims 62 (shown in FIGS. 2 and 4) and head-side washers 172, but excluding any nut-side washers 170, by a conversion factor (e.g., 0.0625) and rounding the result to the next larger whole number. In some examples, the grip length numbers of the longest and shortest suitable bolts are given by $$\text{maxGripNumber} = (\text{maxLength} - TL)/0.0625$$

$$\text{minGripNumber} = (\text{minLength} - TL)/0.0625.$$

In some examples, the suitable bolt 155 is also selected based on the second criterion that threaded portion 157 extends beyond nut 168 by at least a first amount. The first, second, and third criteria are satisfied for a given assembly stackup 45 if the following relationships are true:

$$(\text{maxLength} - \text{maxGrip} - \text{nutWasher} - \text{nut}) > U$$

$$(\text{minLength} - \text{minGrip} - \text{nutWasher} - \text{nut}) > U$$

where nut is the thickness of nut 168 and U is the length of threaded portion 157 that is desired to protrude beyond the nut (e.g., U is the first amount of the second criterion). In some examples, U is the length of a chamfer at the end of threaded portion 157.

A defined fastener 55 comprising bolt assembly 150 having bolt assembly components 152 satisfying one or more of the criteria defined above may be identified and used to join parts 30 and 32. For example, bolt assembly components 152 satisfying the selected criteria may be selected from a plurality of different fastener components available for use.

B. Illustrative Sleeve Bolt Assembly and Criteria

Figure 8:
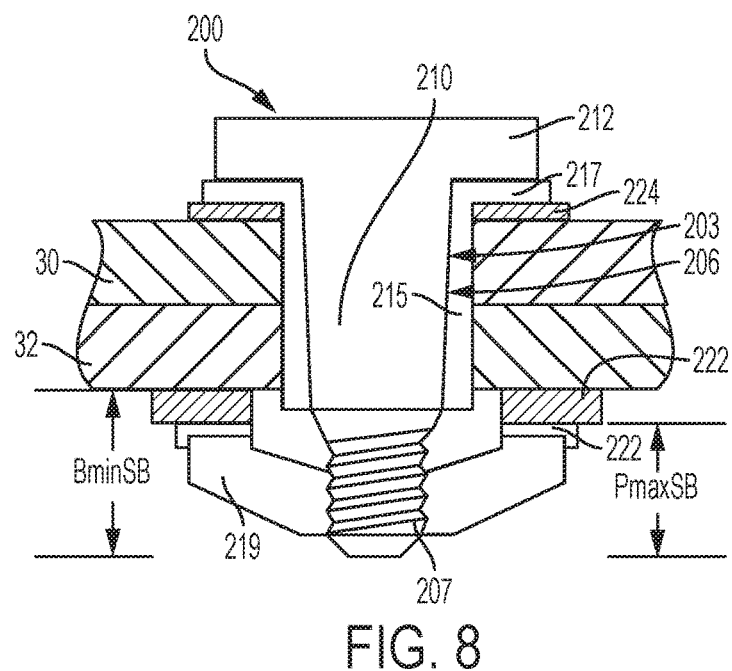
FIG. 8 is a side view of an illustrative sleeve bolt assembly joining two parts.

As shown in FIG. 8, this section describes an illustrative sleeve bolt assembly 200. Sleeve bolt assembly 200 is an example of fastener 40, described above.

Sleeve bolt assembly 200 is depicted in FIG. 8. Sleeve bolt assembly 200 includes a sleeve bolt 203. Sleeve bolt 203 has a shank 206. Shank 206 includes a sleeve threaded portion 207, and an unthreaded sleeve grip portion 210. Sleeve bolt 203 further includes a sleeve bolt head 212. Sleeve bolt assembly 200 further includes a sleeve 215 positioned around at least a portion of shank 206. Sleeve 215 may include a sleeve head 217 projecting from an upper end of the sleeve and configured to engage sleeve bolt head 212. Sleeve bolt assembly 200 may further include a sleeve nut 219, sleeve nut-side washer 222, and/or sleeve head-side washer 224.

The maximum and minimum suitable lengths of sleeve bolt 203 (defined as the distance from the bottom of sleeve head 217 to the bottom of sleeve threaded portion 207) are given in the following equations as maxLengthSB and minLengthSB respectively:

$$\mathrm{maxLength}SB = FT + \mathrm{headWashers}SB + \mathrm{stack} + \mathrm{nutWashers}SB + p\mathrm{Max}SB$$

$$\mathrm{minLength}SB = FT + \mathrm{headWashers}SB + \mathrm{stack} + b\mathrm{Min}SB$$

where FT is the thickness of sleeve head 217, headWashersSB is the thickness of sleeve head-side washer 224, and nutWasherSB is the thickness of sleeve nut-side washer 222. FIG. 8 illustrates the quantities pMaxSB and bMinSB. The quantity pMaxSB is the maximum bolt protrusion to avoid bottoming out the nut, and includes the length of sleeve threaded portion 207 and a maximum additional sleeve grip length of sleeve grip portion 210. If the maximum additional sleeve grip length is exceeded, then sleeve nut 219 may bottom out because sleeve grip portion 210 is too long (e.g., the third criterion will be violated). The shortest suitable sleeve bolt 203 will have a sleeve grip portion 210 having a length equal to the sum of FT, headWashersSB, and stack. The quantity bMinSB is the minimum bolt protrusion required to ensure no threads are bearing (in the part stackup bore) and includes the length of sleeve threaded portion 207 and a minimum additional sleeve grip length of sleeve grip portion 210. If the minimum additional sleeve grip length is not met, then too many threads of sleeve threaded portion 207 will be positioned within bore 165 (e.g., the first criterion is not met). The quantities pMaxSB and bMinSB may accommodate tolerance stackup in the dimensions stack, headWashersSB, and nutWasherSB. The values of pMaxSB and bMinSB may be determined based on specific properties of a given application and/or assembly fastener site 38. For example, the values of pMaxSB and bMinSB may be determined based on the dimensions of parts 30 and 32 in this example, sleeve head-side washer 224, and/or sleeve nut-side washer 222.

Maximum and minimum lengths of sleeve 215 (defined as the distance from the bottom of sleeve head 217 at the shank to the bottom of sleeve 215 distal the head) are labeled MaxSleeveLength and MinSleeveLength. The lengths of sleeve 215 may be referred to as sleeve grip lengths. The maximum and minimum lengths of sleeve 215 are given by the following equations:

$$\mathrm{maxSleeveLength} = \mathrm{maxLength}SB - TL - d - FT$$

$$\mathrm{minSleeveLength} = \mathrm{minLength}SB - TL - d - FT$$

where TL is the length of sleeve threaded portion 207 along the bolt axis and d is an allowance factor. In some examples, d is equal to the combined tolerances of the length of sleeve bolt 203 and the length of sleeve grip portion 210; the combined tolerances may be equal to, e.g., 0.030. In some examples, the minimum and maximum lengths of sleeve 215 may be converted into sleeve grip length numbers by dividing by a conversion factor such as 0.0625:

$$\mathrm{maxSleeveLengthNumber} = (\mathrm{maxLength}SB - TL - d - FT)/0.0625$$

$$\mathrm{minSleeveLengthNumber} = (\mathrm{minLength}SB - TL - d - FT)/0.0625.$$

A sleeve bolt 203, suitable for use with a sleeve 215 having a length between maxSleeveLength and minSleeveLength, may have a sleeve grip portion 210 having a length greater than or equal to minSleeveGrip in the following equation:

$$\mathrm{minSleeveGrip} = FT + \mathrm{stack} + SP1$$

where SP1 is a desired distance by which sleeve 215 protrudes beyond part 32.

C. Illustrative System for Measuring Dimensions

Figure 9:
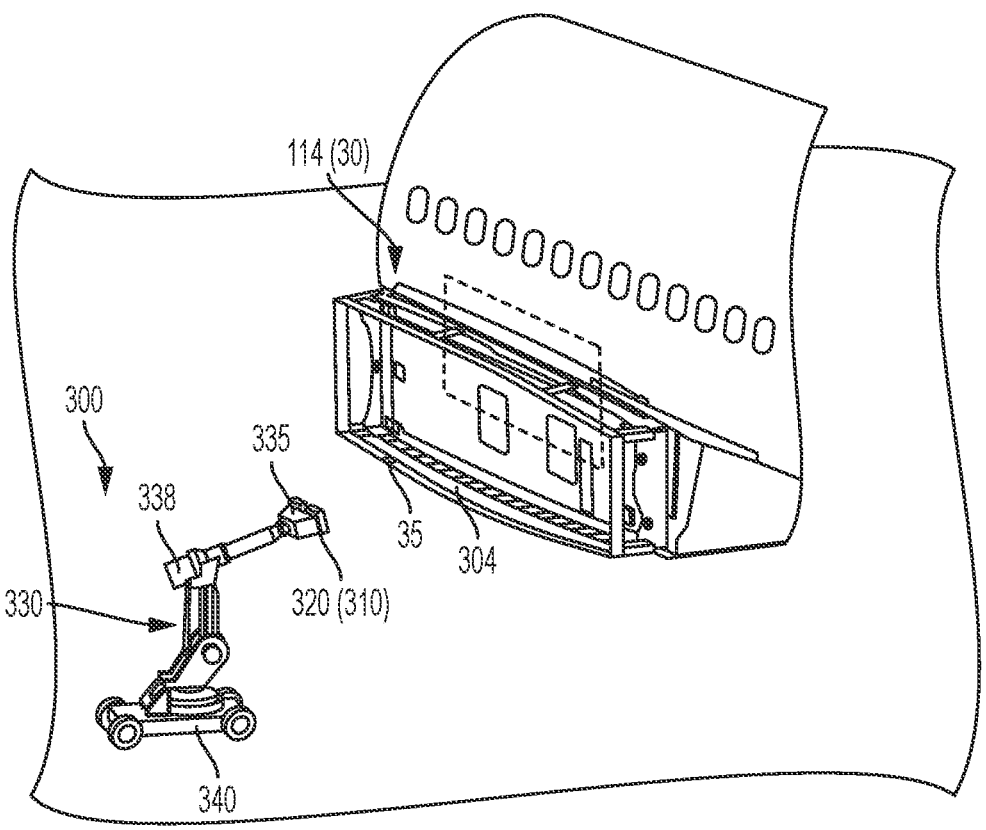
FIG. 9 is a fragmentary isometric view of an illustrative laser scanner on a mobile platform scanning a wing stub.
Figure 10:
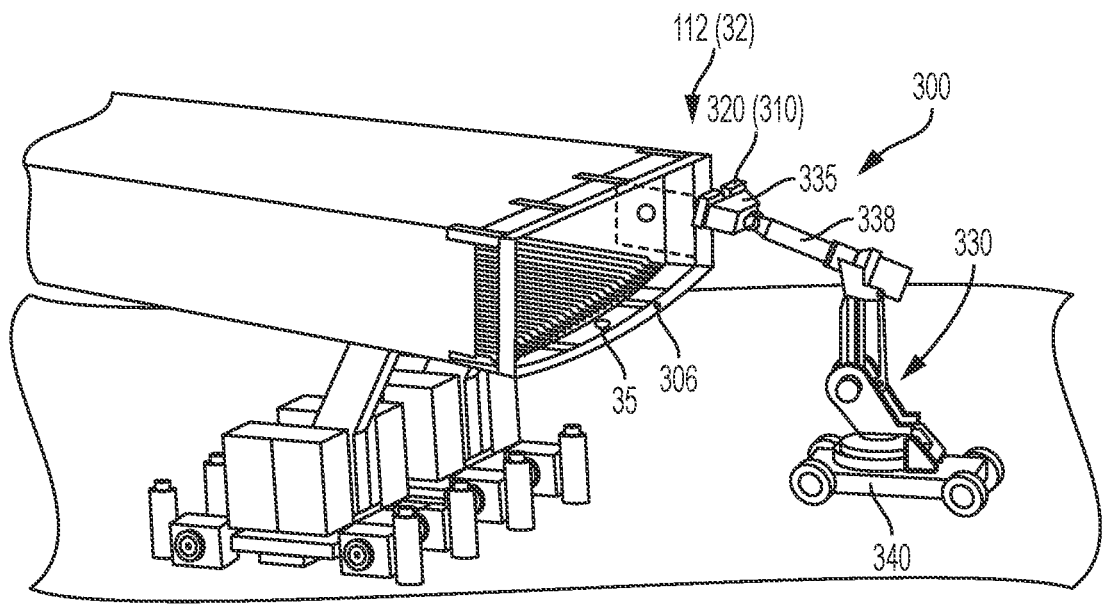
FIG. 10 is a fragmentary isometric view of the illustrative laser scanner scanning a wing root.

As shown in FIGS. 9 and 10, this section describes an illustrative measuring system 300 for measuring dimensions of respective fastener locations 35 on first part 30 and second part 32. As described above, the measured dimensions may be used to identify fastener components 42 of a defined fastener 55 satisfying criteria of an assembly stackup 45 configured to securely fasten parts 30 and 32, as described previously.

FIG. 9 depicts measuring system 300 measuring dimensions of first part 30, which in this example is an aircraft wing stub 114. FIG. 10 depicts measuring system 300 measuring dimensions of second part 32, which in this example is an aircraft wing root 112. Illustrative measuring system 300 includes an electronic sensor 310 configured to measure dimensions of first part 30 and/or second part 32 (e.g., to measure respective surface profiles of parts 30 and/or 32). Measuring dimensions of parts 30 and/or 32 typically includes measuring dimensions of respective fastener locations 35. For example, if fastener locations 35 include bores, then electronic sensor 310 measures the surfaces of the bores, obtaining information such as the diameter of the bores as a function of depth within parts 30 and 32, angles formed by walls of the bores and other surfaces of the parts, and so on. Measuring dimensions of parts 30 and 32 may include measuring locations of a first set of features 304 on first part 30 and/or locations of a second set of features 306 on second part 32. Features 304 and/or 306 may include, for example, fastener locations 35, edges, corners, markings, bores, flat or curved expanses, ridges, and so on. Data acquired by measuring parts 30 and/or 32 may represent a 3D surface profile of the parts. The data may take the form of a point cloud.

Electronic sensor 310 may be configured to measure dimensions of parts 30 and 32 in a non-contact manner. For example, electronic sensor 310 may comprise a laser scanner 320 configured to scan parts 30 and/or 32 to measure dimensions of the parts using optical techniques. Accordingly, laser scanner 320 includes at least one light source (e.g., light projectors, lasers, lamps, LEDs, etc.) configured to illuminate parts 30 and 32, and at least one optical sensor (e.g., digital cameras, photodiodes, CCD arrays, CMOS arrays, and/or photomultiplier tubes) configured to measure light propagating from the parts (e.g., light that is reflected, diffused, diffracted, fluoresced, scattered, emitted, and so on). The light source, optical sensor, and/or other components of laser scanner 320 may be configured to acquire data associated with dimensions and/or geometry of parts 30 and/or 32 using techniques such as machine vision, 3D optical scanning (e.g., laser tracking, LIDAR, and/or laser range finding), photogrammetry, and/or structured light imaging.

Machine vision techniques use electronic imaging and algorithms to extract geometric information from one or more images of the object under study (e.g., parts 30 and/or 32). 3D optical scanning techniques use light reflection to calculate the surface geometry of the object under study, typically using triangulation and/or time-of-flight measurements of the reflected light. Photogrammetry techniques determine surface geometry of the object under study through analysis of electronic images, typically including images taken from different perspectives, possibly acquired using multiple cameras. Structured light imaging techniques project a pattern of light onto the object under study and calculate the surface geometry from distortions detected in the pattern reflected by the surface of the studied object.

Laser scanner 320 may be configured to measure the locations of target features on the surfaces of parts 30 and/or 32. The target features may be optically distinct objects (e.g., objects configured to reflect and/or fluoresce) applied to parts 30 and/or 32 to facilitate the measurement. These target features are examples of features 304 and 306.

In some examples, laser scanner 320 (or another electronic sensor 310 of measuring system 300) is mounted to a mobile platform 330. FIGS. 9 and 10 depict laser scanner 320 mounted to mobile platform 330 deployed on a factory floor to measure surfaces of illustrative aircraft wing stub 114 and aircraft wing root 112, respectively. Mobile platform 330 includes a scanner head 335 to which laser scanner 320 is mounted. Scanner head 335 is attached to an arm 338 attached to a carriage 340. Arm 338 may be an articulated arm (also called a robotic arm) configured to move and/or to position scanner head 335 for measurement of objects such as wing root 112, wing stub 114, or portions thereof, from different angles and/or different locations. Arm 338 may be configured to move scanner head 335 through six degrees of freedom (including translation along three orthogonal spatial axes and rotation about each axis). Movement of arm 338 may be enabled by actuators, motors, and/or similar devices within mobile platform 330. Carriage 340 may be configured to be moved across the factory floor. In some examples, carriage 340 moves autonomously using, e.g., a motor or other power source. Alternatively, or additionally, carriage 340 may be configured to be moved manually and/or by a gantry, cables, and so on. Carriage 340 may include mechanisms such as wheels, treads, air bearings, and/or magnetic levitators facilitating movement of the carriage.

D. Illustrative Fastener Diagram

Figure 11:
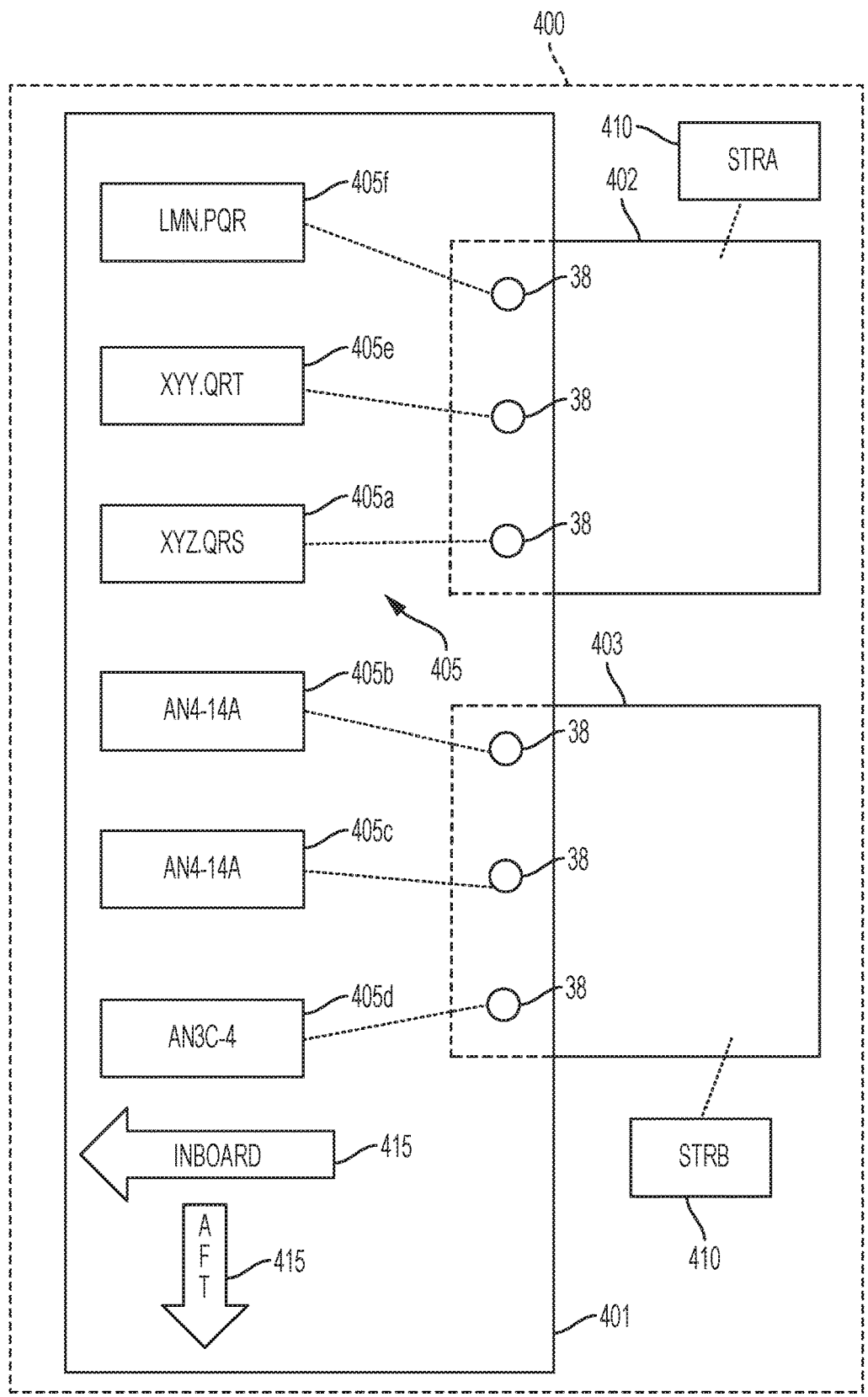
FIG. 11 is a schematic depiction of an illustrative diagram identifying determined fasteners to be installed at assembly fastener locations.

As shown in FIG. 11, this section describes an illustrative fastener diagram 400. Fastener diagram 400, which may also be referred to as a fastener template, is an example of a diagram illustrating a structure of the assembly of parts to be joined, such as parts 30 and 32 shown in FIG. 2. Diagram 400 may be automatically generated using structural design information included in a parts design data base once fasteners at each identified fastener assembly location for use as an aid for a mechanic or technician in joining the parts with the correct defined fasteners. Consulting the diagram may make the process of joining the associated parts faster and/or more efficient.

In FIG. 11, a first illustrative part 401, which may be an example of part 30 described previously, is to be fastened to both a second illustrative part 402 and a third illustrative part 403. Parts 402 and 403 may each be an example of part 32 described previously.

In this example, fastener diagram 400 identifies specific fastener components to be installed at specified assembly fastener locations 38. The specified fastener components 42 indicated in fastener diagram 400 correspond to defined fasteners 55 satisfying criteria associated with assembly stackups 45 at each assembly fastener location 38 depicted in the fastener diagram.

Indicia 405 on fastener diagram 400 identify the specific defined fastener that is to be used at each assembly fastener location 38. Indicia 405 may include alphanumerical characters coded to indicate part numbers of specific fastener components making up a defined fastener. For example, indicia 405 may include a grip length number, a sleeve length number, and/or a bolt identifier that has a specific configuration of features. Additionally, or alternatively, indicia 405 may include characters specifying nominal dimensions and/or part numbers of fastener components having specific fastener component types, bolt head sizes, head shapes, grip portion lengths, threaded portion lengths, shank diameters, thread pitches, washer inner diameters, washer outer diameters, washer shapes, washer thicknesses, nut shapes, nut thicknesses, nut inner diameters, nut outer diameters, sleeve lengths, sleeve head thicknesses, sleeve head shapes, sleeve inner diameters, sleeve outer diameters, tolerances, precisions, materials, alloys, corrosion resistances, strengths, magnetic properties, sizes and positions of holes (for cotter pins, safety wire, etc.), and so on.

In some examples, alphanumeric characters of indicia 405 explicitly include identifying information, such as a manufacturer's part number, or the length of a bolt shank in inches. In some examples, indicia 405 comprise non-alphanumeric symbols and/or icons. In some examples, indicia 405 correspond to positions of fastener components disposed in a fastener kit and/or bolt board carried by a mechanic assembling parts 401, 402, and 403. In some examples, indicia 405 identifies a combination of predefined components in a fastener subassembly or a complete fastener assembly. Additionally or alternatively, indicia 405 may provide a unique identifier for the defined fastener at each fastener location or for an associated group of fastener locations having the same defined fastener. Such a unique identifier may include indicia representative of the location. That is, each assembly fastener location may have a unique identifier and the indicia may indicate the assembly fastener location and the associated defined fastener components.

FIG. 11 depicts, as examples of indicia 405, illustrative indicia 405a, 405b, 405c, 405d, 405e, and 405f. First illustrative indicium 405a contains values (represented here as "XYZ.QRS") representative of dimensions or specific identifiers of components of the defined fastener, or complete fastener assembly identifiers to be installed at each identified assembly fastener location 38 or associated group of assembly fastener locations, as discussed above. Second illustrative indicium 405b contains a manufacturer part number "AN4-14A" identifying an AN-type fastener component to be installed at the assembly fastener location 38 indicated in diagram 400. Similarly, illustrative indicia 405c and 405d indicate manufacturer part numbers identifying fastener components to be installed at the indicated assembly fastener locations 38. Illustrative indicia 405e and 405f contain values representative of dimensions and/or identifiers associated with fasteners and/or fastener components to be installed at the indicated assembly fastener locations 38. The formats of indicia 405e and 405f may be similar to the format of indicium 405a. It should be understood that the generic indicia illustrated are examples and in any given diagram, the various fastener indicia preferably have consistent formats and may provide a unique indicium for each assembly fastener location 38 that may include indicia also or alternatively identifying the individual assembly fastener location.

A table listing the specific fastener components corresponding to the defined fastener for each of the indicia 405 may be included on fastener diagram 400 and/or provided along with the fastener diagram.

Fastener diagram 400 may include information identifying one or more of the parts 401-403 and/or the positions of specific assembly fastener locations 38 on the assembly of structure components or parts 401 and 402 and the assembly of structure components or parts 401 and 403. For example, if parts 401, 402, and 403 are parts of a structure in the form of an aircraft 100, as shown in FIG. 3, fastener diagram 400 may include subassembly indicia 410 identifying aircraft components, and/or portions of aircraft components, on which assembly fastener locations 38 are positioned. FIG. 11 depicts subassembly indicia 410 identifying components 402 and 403 appearing on fastener diagram 400 as struts identified as A and B. Fastener diagram 400 may also include orienting indicia 415, such as one or more arrows indicating upward, downward, forward, aft, inboard, and/or outboard directions.

E. Illustrative Method for Fastening Two Parts Together

Figure 12:
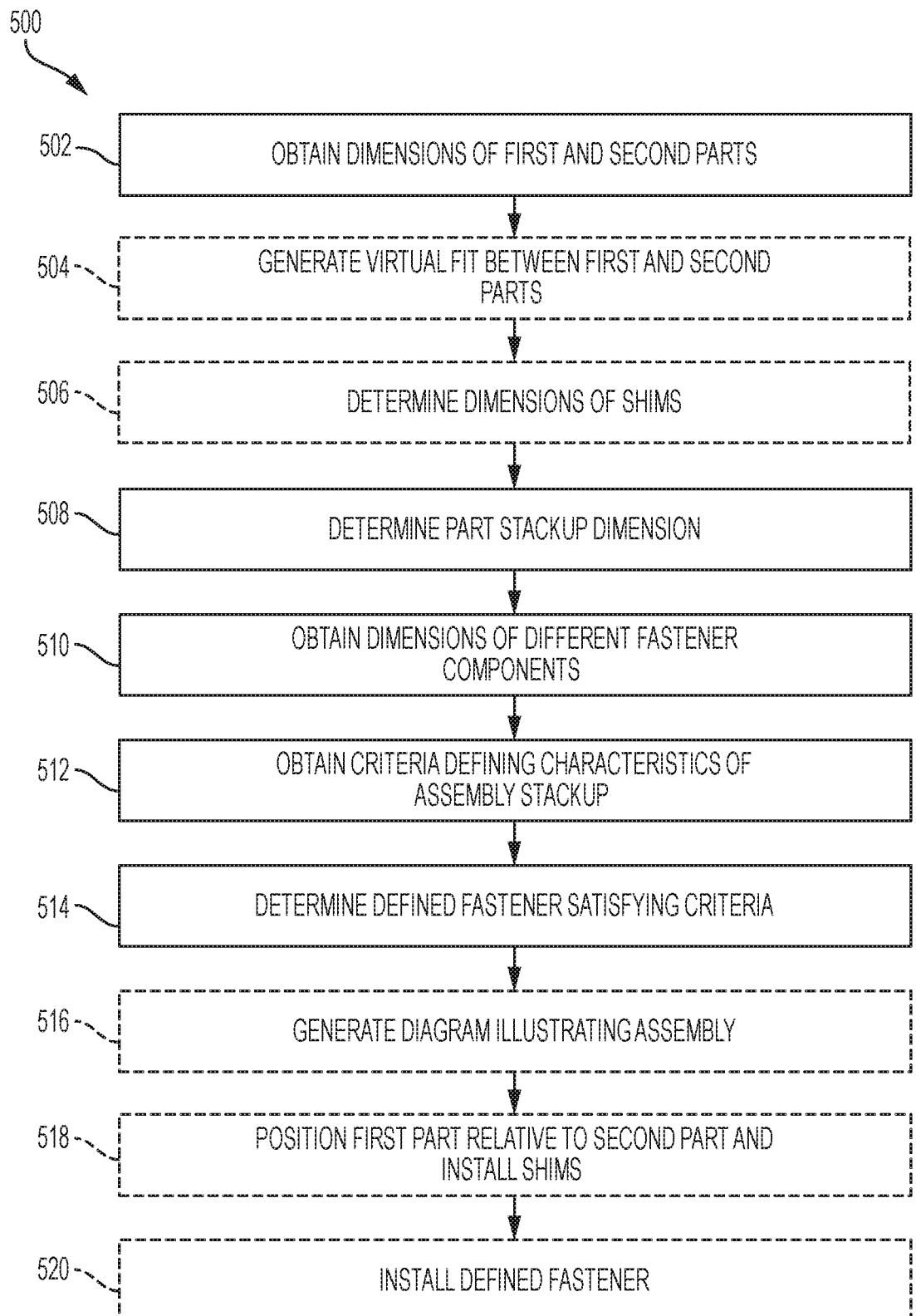
FIG. 12 is a flow diagram depicting steps in an illustrative method for fastening two parts together.

This section describes steps of an illustrative method 500 for fastening two structural parts together; see FIG. 12. Aspects of fasteners and systems described herein may be utilized in the method steps described below. Where appropriate, reference may be made to components and systems that may be used in carrying out each step. These references are for illustration, and are not intended to limit the possible ways of carrying out any particular step of the method. Reference numbers included in the description of method 500 for objects referred to are to corresponding objects described above with reference to an associated figure.

FIG. 12 is a flowchart illustrating steps performed in an illustrative method, and may not recite the complete process or all steps of the method. Although various steps of method 500 are described below and depicted in FIG. 12, the steps need not necessarily all be performed, and in some cases may be performed simultaneously or in a different order than the order shown.

At step 502, method 500 includes obtaining dimensions of a first part 30 and a second part 32 at respective fastener locations 35 on the two parts. Respective fastener locations 35 on parts 30 and 32 form assembly fastener location 38 of an assembly of the first part joined with the second part. At assembly fastener location 38, first part 30 is to be fastened to second part 32 by an assembled fastener 40. Assembled fastener 40 may comprise, e.g. bolt assembly 150 and/or sleeve bolt assembly 200. Obtaining dimensions of parts 30 and 32 may include measuring parts 30 and 32 using at least one electronic sensor 310. In some examples, the electronic sensor comprises at least one laser scanner 320, and measuring parts 30 and 32 includes scanning parts 30 and 32 at fastener locations 35 using the at least one laser scanner. Additionally, or alternatively, obtaining dimensions of first part 30 and second part 32 at respective fastener locations 35 at step 502 includes obtaining nominal parameters for parts 30 and 32 and tolerances of assembled fastener 40 obtained from a design data base having design data for a structure including parts 30 and 32.

In some examples, obtaining dimensions of first part 30 and second part 32 at respective fastener locations 35 at step 502 includes obtaining dimensions of the first part and the second part, obtaining information specifying the respective fastener locations on the first and second parts, and determining the dimensions of the first and second parts at the respective fastener locations from the dimensions of the first part and the second part and the information specifying the respective fastener locations. In these examples, obtaining dimensions of first part 30 and second part 32 may include receiving data defining design dimensions and manufacturing tolerances of the first part and the second part. Such data may be received in response to appropriate inquiry to the design data base.

At step 504, method 500 optionally includes generating a virtual fit between first part 30 and second part 32 based on the obtained dimensions of the first and second parts.

At step 506, method 500 optionally includes determining, based on the virtual fit, dimensions of one or more shims 62 to be positioned at assembly fastener location 38.

At step 508, method 500 includes determining, based on the dimensions of parts 30 and 32 at respective fastener locations 35, a part stackup dimension for assembled fastener 40 at the corresponding assembly fastener location 38. The part stackup dimension includes at least a first dimension of first part 30 and a second dimension of second part 32. If optional step 506 is performed, then determining the part stackup dimension at step 508 also includes determining the dimension of shims 62. That is, the part stackup dimension includes dimensions of shim 62 as well as the first dimension of first part 30 and second dimension of second part 32.

At step 510, method 500 includes obtaining dimensions of each of a plurality of different fastener components 42 available for use in assembled fastener 40.

At step 512, method 500 includes obtaining criteria defining characteristics of assembly stackup 45 including parts 30 and 32 and assembled fastener 40. The characteristics may include, for example, dimensions of one or more fastener components 42 and/or dimensions of assembly stackup 45. The criteria may be associated with a secure join between parts 30 and 32. The criteria may be associated with, e.g., the positioning of threaded portion 157 of a bolt 155 relative to other components of bolt assembly 150 and/or to parts 30 and 32. The criteria may comprise the first, second, third, and/or fourth illustrative criteria described above.

At step 514, method 500 includes determining a defined fastener 55 satisfying the criteria obtained in step 512 having fastener components 42 selected from the plurality of different fastener components 42 available for use.

At step 516, method 500 optionally includes generating a diagram illustrating pictorially the position of identified defined fasteners relative to the assembled structure. As an example, step 516 may include generating a diagram corresponding to diagram 400 illustrating a structure of the assembly of parts 401 and 402, and a structure of the assembly of parts 401 and 403, and identifying on the diagram assembly fastener location 38 and indicia 405 identifying defined fastener 55.

At step 518, method 500 optionally includes positioning first part 30 relative to second part 32 with respective fastener locations 35 of the first and second parts aligned. If one or more shims 62 were identified at step 506, then step 518 further includes installing at assembly fastener location 38 one or more shims having the determined dimensions.

At step 520, method 500 optionally includes preparing the part stackup of the assembled structure at assembly fastener location 38, such as by drilling a suitable bore, and installing defined fastener 55 at assembly fastener location 38.

F. Illustrative Method of Defining Fasteners for Joining Parts of an Aircraft This section describes steps of an illustrative method 600 for defining fasteners for joining parts of an aircraft; see FIG. 13. Aspects of fastener assemblies and other systems described above may be utilized in the method steps described below. These steps may further elaborate on illustrative examples of steps performed in method 500. Where appropriate, reference may be made to components and systems previously described that may be used in carrying out each step. These references are for illustration, and are not intended to limit the possible ways of carrying out any particular step of the method.

Figure 13:
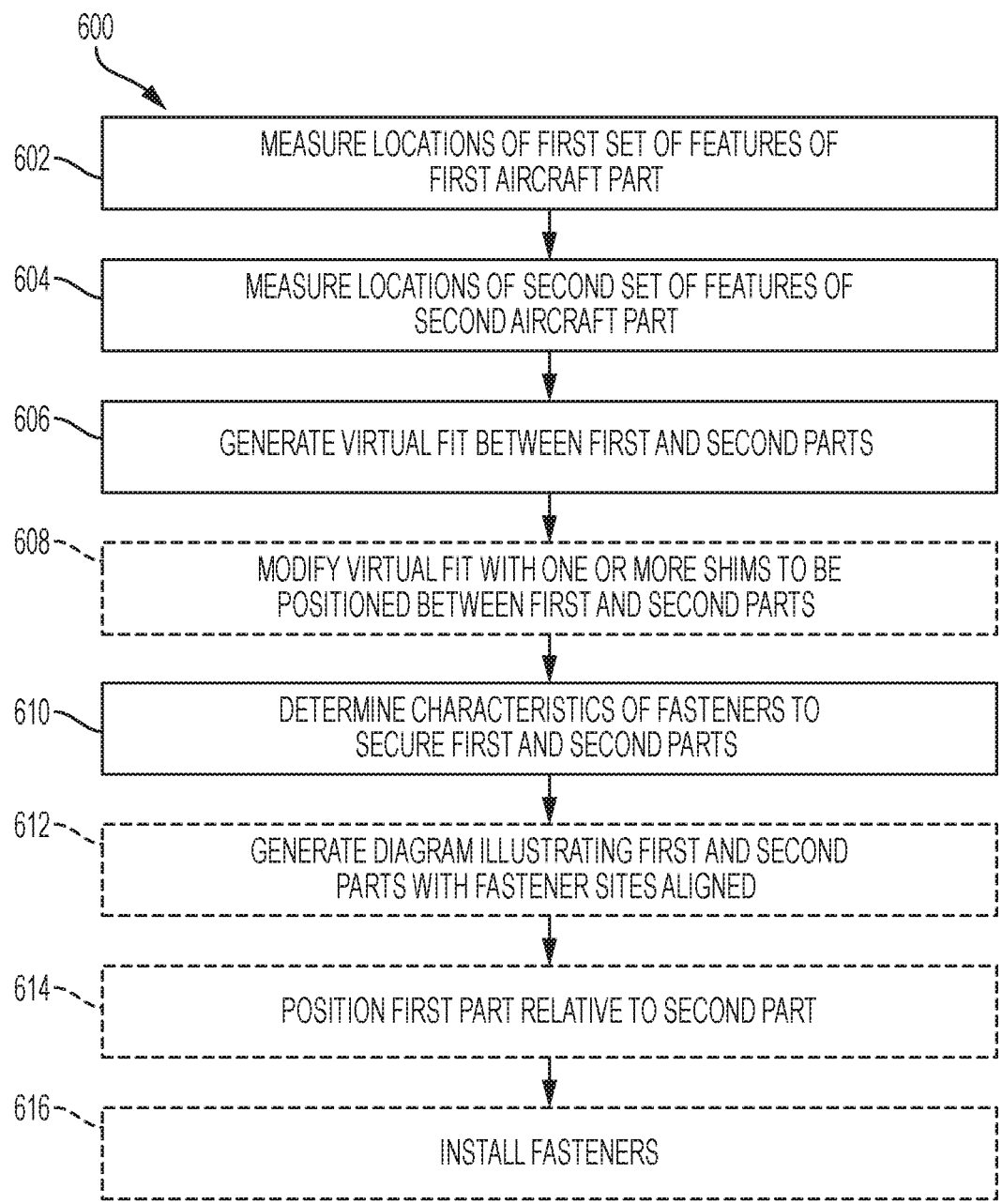
FIG. 13 is a flow diagram depicting steps in an illustrative method for defining fasteners for joining parts of an aircraft.

FIG. 13 is a flowchart illustrating steps performed in an illustrative method, and may not recite the complete process or all steps of the method. Although various steps of method 600 are described below and depicted in FIG. 13, the steps need not necessarily all be performed, and in some cases may be performed simultaneously or in a different order than the order shown.

At step 602, method 600 includes measuring locations of a first set of features 304 of a first part 30, which in method 600 is a first part of an aircraft. First part 30 may be, e.g., fuselage 110.

At step 604, method 600 includes measuring locations of a second set of features 306 of a second part 32, which in method 600 is a second part of an aircraft. Second part 32 may be, e.g., wing 105.

Measuring the locations of first set of features 304 and second set of features 306 may include using at least one electronic sensor. The at least one electronic sensor may include at least one laser scanner 320, and measuring the locations may include scanning the first and second parts 30 and 32 using the at least one scanner.

At step 606, method 600 includes generating a virtual fit between first part 30 and second part 32, based on the measured locations of features 304 and 306.

At step 608, method 600 optionally includes modifying the virtual fit generated at step 606 with one or more shims 62 to be positioned between first part 30 and second part 32. Typically step 608 is performed prior to step 610.

At step 610, method 600 includes determining, based on the virtual fit, characteristics of one or more fasteners 40 to secure first part 30 to second part 32 at respective fastener sites (e.g., fastener locations 35) within the first and second parts.

Fasteners 40 may include at least one bolt (e.g., bolt 155), and the characteristics of the fasteners may include a length of a grip portion 160 of the at least one bolt. In some examples, fasteners 40 include bolt assembly 150 and/or sleeve bolt assembly 200. The fastener sites of the first and second aircraft parts may comprise bores configured to accept bolts 155.

Determining characteristics of one or more fasteners 40 to secure first and second parts 30 and 32 may include determining the fastener characteristic based on obtained criteria defining the characteristics. For example, determining the fastener characteristics may include determining a minimum length for a grip portion 160 of a bolt 155, and/or a maximum length for the grip portion. The criteria may comprise one or a combination of the first, second, third, and fourth illustrative criteria described above.

At step 612, method 600 optionally includes generating diagram 400 illustrating a structure of first part 30 and second part 32 positioned with respective fastener sites aligned, and identifying on the diagram the aligned fastener sites.

At step 614, method 600 optionally includes positioning first part 30 relative to second part 32 with respective fastener sites of the first and second parts aligned, and positioning one or more shims 62 between the first and second parts.

At step 616, method 600 optionally includes installing one or more fasteners 40 having the characteristics determined at step 610 at the aligned respective fastener sites of first part 30 and second part 32. Step 616 may include for each assembly fastener location, drilling a bore, and measuring the part stackup dimension in the drilled bore, installing the defined fastener, and confirming that the fastener as installed satisfies the one or more criteria.

F. Illustrative Aircraft and Associated Method

Examples disclosed herein may be described in the context of an illustrative aircraft manufacturing and service method 700 (see FIG. 14) and an illustrative aircraft 100 (see FIG. 15). Method 700 includes a plurality of processes, stages, or phases. During pre-production, method 700 may include a specification and design phase 704 of aircraft 100 and a material procurement phase 706. During production, a component and subassembly manufacturing phase 708 and a system integration phase 710 of aircraft 100 may take place. Thereafter, aircraft 100 may go through a certification and delivery phase 712 to be placed into in-service phase 714. While in service (e.g., by an operator), aircraft 100 may be scheduled for routine maintenance and service 716 (which may also include modification, reconfiguration, refurbishment, and so on of one or more systems of aircraft 100). While the embodiments described herein relate generally to use during component and subassembly manufacturing phase 708 of aircraft 100, they may be practiced at other stages of method 700.

Each of the processes of method 700 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 15, aircraft 100 produced by illustrative method 700 may include a frame 802 with a plurality of systems 804 and an interior 806. Examples of plurality of systems 804 include one or more of a propulsion system 808, an electrical system 810, a hydraulic system 812, an environmental system 814, a cargo system 816, and a landing system 818. Each system may comprise various subsystems, such as controllers, processors, actuators, effectors, motors, generators, etc., depending on the functionality involved. Any number of other systems may be included. Although an aerospace example is shown, the principles disclosed herein may be applied to other industries, such as the automotive industry, rail transport industry, and nautical engineering industry. Accordingly, in addition to aircraft 100, the principles disclosed herein may apply to other vehicles, e.g., land vehicles, marine vehicles, etc., or other industries involving the joining of parts during assembly of a structure.

Apparatuses and methods shown or described herein may be employed during any one or more of the stages of the manufacturing and service method 700. For example, components or subassemblies corresponding to component and subassembly manufacturing phase 708 may be fabricated or manufactured in a manner similar to components or subassemblies produced while aircraft 100 is operating during in-service phase 714. Also, one or more examples of the apparatuses, methods, or combinations thereof may be utilized during production stages 708 and 710, for example, by substantially expediting assembly of or reducing the cost of aircraft 100. Similarly, one or more examples of the apparatus or method realizations, or a combination thereof, may be utilized, for example and without limitation, while aircraft 100 is in in-service phase 714 and/or during maintenance and service phase 716.

G. Illustrative Data Processing System

Figure 16:
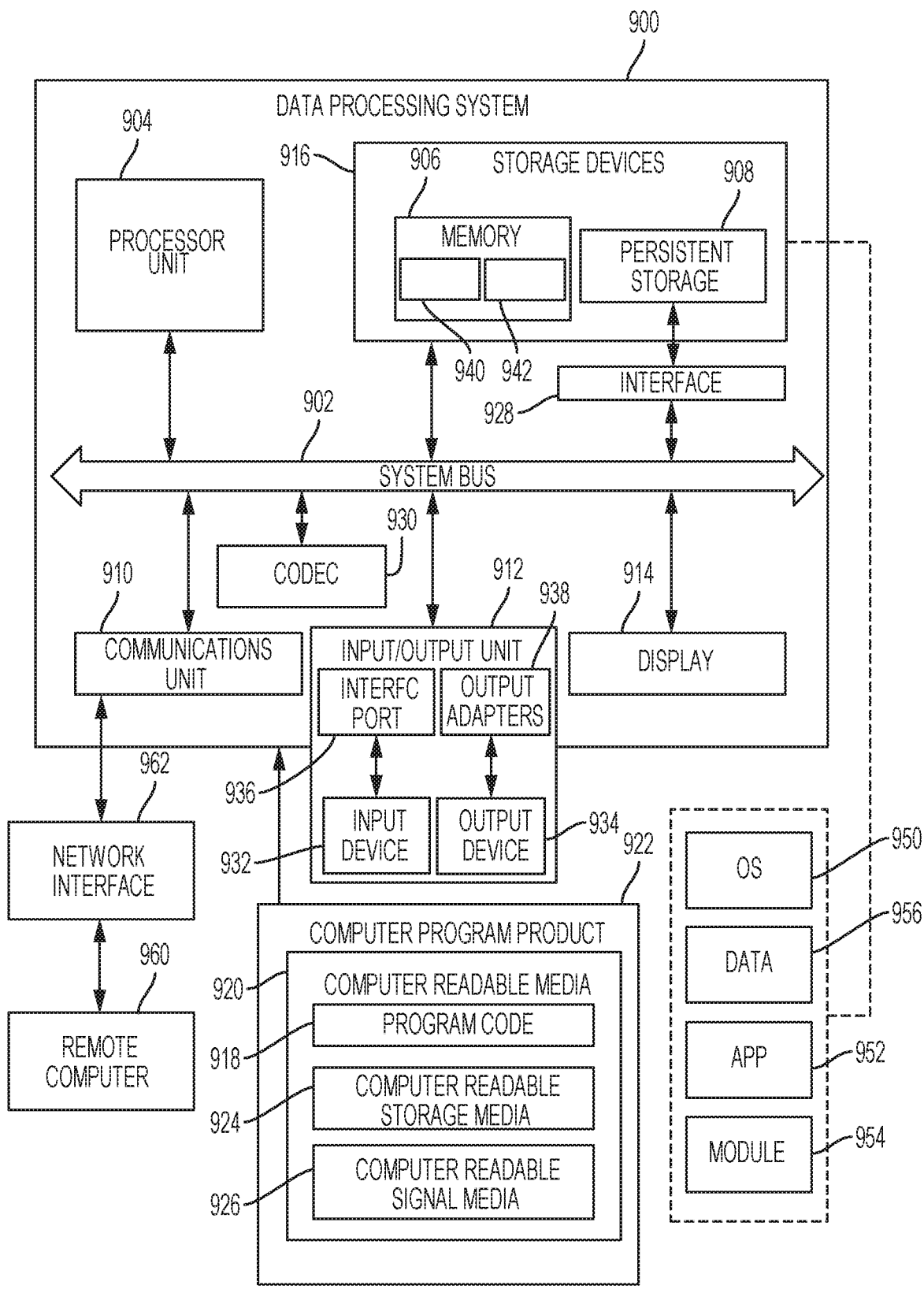
FIG. 16 is a schematic diagram depicting an illustrative data processing system.

As shown in FIG. 16, this example describes a data processing system 900 (also referred to as a computer, computing system, and/or computer system). In this example, data processing system 900 is an illustrative data processing system suitable for implementing aspects of the fastener prediction systems and methods disclosed herein. More specifically, in some examples, devices that are embodiments of data processing systems (e.g., smartphones, tablets, personal computers) may be used to perform a virtual fit between parts 30 and 32, to control and/or to retrieve data from electronic sensor 310, to search a database including data associated with fastener components 42 available for use in assembled fastener 40, to determine defined fastener 55 satisfying one or more fastener criteria, to calculate a part stackup dimension, to generate and/or display diagram 400, and so on.

In this illustrative example, data processing system 900 includes a system bus 902 (also referred to as communications framework). System bus 902 may provide communications between a processor unit 904 (also referred to as a processor or processors), a memory 906, a persistent storage 908, a communications unit 910, an input/output (I/O) unit 912, a codec 930, and/or a display 914. Memory 906, persistent storage 908, communications unit 910, input/output (I/O) unit 912, display 914, and codec 930 are examples of resources that may be accessible by processor unit 904 via system bus 902.

Processor unit 904 serves to run instructions that may be loaded from persistent storage 908 into memory 906. Processor unit 904 may comprise a number of processors, a multi-processor core, and/or a particular type of processor or processors (e.g., a central processing unit (CPU), graphics processing unit (GPU), etc.), depending on the particular implementation. Further, processor unit 904 may be implemented using a number of heterogeneous processor systems in which a main processor is present with secondary processors on a single chip. As another illustrative example, processor unit 904 may be a symmetric multi-processor system containing multiple processors of the same type.

Memory 906 and persistent storage 908 are examples of storage devices 916. A storage device may include any suitable hardware capable of storing information (e.g., digital information), such as data, program code in functional form, and/or other suitable information, either on a temporary basis or a permanent basis.

Storage devices 916 also may be referred to as computer-readable storage devices or computer-readable media. Memory 906 may include a volatile storage memory 940 and a non-volatile memory 942. In some examples, a basic input/output system (BIOS), containing the basic routines to transfer information between elements within the data processing system 900, such as during start-up, may be stored in non-volatile memory 942. Persistent storage 908 may take various forms, depending on the particular implementation.

Persistent storage 908 may contain one or more components or devices. For example, persistent storage 908 may include one or more devices such as a magnetic disk drive (also referred to as a hard disk drive or HDD), solid state disk (SSD), floppy disk drive, tape drive, Jaz drive, Zip drive, flash memory card, memory stick, and/or the like, or any combination of these. One or more of these devices may be removable and/or portable, e.g., a removable hard drive. Persistent storage 908 may include one or more storage media separately or in combination with other storage media, including an optical disk drive such as a compact disk ROM device (CD-ROM), CD recordable drive (CD-R Drive), CD rewritable drive (CD-RW Drive), and/or a digital versatile disk ROM drive (DVD-ROM). To facilitate connection of the persistent storage devices 908 to system bus 902, a removable or non-removable interface is typically used, such as interface 928.

Input/output (I/O) unit 912 allows for input and output of data with other devices that may be connected to data processing system 900 (i.e., input devices and output devices). For example, input device 932 may include one or more pointing and/or information-input devices such as a keyboard, a mouse, a trackball, stylus, touch pad or touch screen, microphone, joystick, game pad, satellite dish, electronic sensor, scanner, TV tuner card, digital camera, digital video camera, web camera, and/or the like. These and other input devices may connect to processor unit 904 through system bus 902 via interface port(s) 936. Interface port(s) 936 may include, for example, a serial port, a parallel port, a game port, and/or a universal serial bus (USB).

Output devices 934 may use some of the same types of ports, and in some cases the same actual ports, as input device(s) 932. For example, a USB port may be used to provide input to data processing system 900 and to output information from data processing system 900 to an output device 934. Output adapter 938 is provided to illustrate that there are some output devices 934 (e.g., monitors, speakers, and printers, among others) which require special adapters. Output adapters 938 may include, e.g. video and sounds cards that provide a means of connection between the output device 934 and system bus 902. Other devices and/or systems of devices may provide both input and output capabilities, such as remote computer(s) 960. Display 914 may include any suitable human-machine interface or other mechanism configured to display information to a user, e.g., a CRT, LED, or LCD monitor or screen, etc.

Communications unit 910 refers to any suitable hardware and/or software employed to provide for communications with other data processing systems or devices. While communication unit 910 is shown inside data processing system 900, it may in some examples be at least partially external to data processing system 900. Communications unit 910 may include internal and external technologies, e.g., modems (including regular telephone grade modems, cable modems, and DSL modems), ISDN adapters, and/or wired and wireless Ethernet cards, hubs, routers, etc.

Data processing system 900 may operate in a networked environment, using logical connections to one or more remote computers 960. A remote computer(s) 960 may include a personal computer (PC), a server, a router, a network PC, a workstation, a microprocessor-based appliance, a peer device, a smart phone, a tablet, another network note, and/or the like. Remote computer(s) 960 typically include many of the elements described relative to data processing system 900. Remote computer(s) 960 may be logically connected to data processing system 900 through a network interface 962 which is connected to data processing system 900 via communications unit 910.

Network interface 962 encompasses wired and/or wireless communication networks, such as local-area networks (LAN), wide-area networks (WAN), and cellular networks. LAN technologies may include Fiber Distributed Data Interface (FDDI), Copper Distributed Data Interface (CDDI), Ethernet, Token Ring, and/or the like. WAN technologies include point-to-point links, circuit switching networks (e.g., Integrated Services Digital networks (ISDN) and variations thereon), packet switching networks, and Digital Subscriber Lines (DSL).

Codec 930 may include an encoder, a decoder, or both, comprising hardware, software, or a combination of hardware and software. Codec 930 may include any suitable device and/or software configured to encode, compress, and/or encrypt a data stream or signal for transmission and storage, and to decode the data stream or signal by decoding, decompressing, and/or decrypting the data stream or signal (e.g., for playback or editing of a video). Although codec 930 is depicted as a separate component, codec 930 may be contained or implemented in memory, e.g., non-volatile memory 942.

Non-volatile memory 942 may include read only memory (ROM), programmable ROM (PROM), electrically programmable ROM (EPROM), electrically erasable programmable ROM (EEPROM), flash memory, and/or the like, or any combination of these. Volatile memory 940 may include random access memory (RAM), which may act as external cache memory. RAM may comprise static RAM (SRAM), dynamic RAM (DRAM), synchronous DRAM (SDRAM), double data rate SDRAM (DDR SDRAM), enhanced SDRAM (ESDRAM), and/or the like, or any combination of these.

Instructions for the operating system, applications, and/or programs may be located in storage devices 916, which are in communication with processor unit 904 through system bus 902. In these illustrative examples, the instructions are in a functional form in persistent storage 908. These instructions may be loaded into memory 906 for execution by processor unit 904. Processes of one or more embodiments of the present disclosure may be performed by processor unit 904 using computer-implemented instructions, which may be located in a memory, such as memory 906.

These instructions are referred to as program instructions, program code, computer usable program code, or computer-readable program code executed by a processor in processor unit 904. The program code in the different embodiments may be embodied on different physical or computer-readable storage media, such as memory 906 or persistent storage 908. Program code 918 may be located in a functional form on computer-readable media 920 that is selectively removable and may be loaded onto or transferred to data processing system 900 for execution by processor unit 904. Program code 918 and computer-readable media 920 form computer program product 922 in these examples. In one example, computer-readable media 920 may comprise computer-readable storage media 924 or computer-readable signal media 926.

Computer-readable storage media 924 may include, for example, an optical or magnetic disk that is inserted or placed into a drive or other device that is part of persistent storage 908 for transfer onto a storage device, such as a hard drive, that is part of persistent storage 908. Computer-readable storage media 924 also may take the form of a persistent storage, such as a hard drive, a thumb drive, or a flash memory, that is connected to data processing system 900. In some instances, computer-readable storage media 924 may not be removable from data processing system 900.

In these examples, computer-readable storage media 924 is a non-transitory, physical or tangible storage device used to store program code 918 rather than a medium that propagates or transmits program code 918. Computer-readable storage media 924 is also referred to as a computer-readable tangible storage device or a computer-readable physical storage device. In other words, computer-readable storage media 924 is media that can be touched by a person.

Alternatively, program code 918 may be transferred to data processing system 900, e.g., remotely over a network, using computer-readable signal media 926. Computer-readable signal media 926 may be, for example, a propagated data signal containing program code 918. For example, computer-readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 918 may be downloaded over a network to persistent storage 908 from another device or data processing system through computer-readable signal media 926 for use within data processing system 900. For instance, program code stored in a computer-readable storage medium in a server data processing system may be downloaded over a network from the server to data processing system 900. The computer providing program code 918 may be a server computer, a client computer, or some other device capable of storing and transmitting program code 918.

In some examples, program code 918 may comprise an operating system (OS) 950. Operating system 950, which may be stored on persistent storage 908, controls and allocates resources of data processing system 900. One or more applications 952 take advantage of the operating system's management of resources via program modules 954, and program data 956 stored on storage devices 916. OS 950 may include any suitable software system configured to manage and expose hardware resources of computer 900 for sharing and use by applications 952. In some examples, OS 950 provides application programming interfaces (APIs) that facilitate connection of different type of hardware and/or provide applications 952 access to hardware and OS services. In some examples, certain applications 952 may provide further services for use by other applications 952, e.g., as is the case with so-called "middleware." Aspects of present disclosure may be implemented with respect to various operating systems or combinations of operating systems.

The different components illustrated for data processing system 900 are not meant to provide architectural limitations to the manner in which different embodiments may be implemented. One or more embodiments of the present disclosure may be implemented in a data processing system that includes fewer components or includes components in addition to and/or in place of those illustrated for computer 900. Other components shown in FIG. 16 can be varied from the examples depicted. Different embodiments may be implemented using any hardware device or system capable of running program code. As one example, data processing system 900 may include organic components integrated with inorganic components and/or may be comprised entirely of organic components (excluding a human being). For example, a storage device may be comprised of an organic semiconductor.

In some examples, processor unit 904 may take the form of a hardware unit having hardware circuits that are specifically manufactured or configured for a particular use, or to produce a particular outcome or progress. This type of hardware may perform operations without needing program code 918 to be loaded into a memory from a storage device to be configured to perform the operations. For example, processor unit 904 may be a circuit system, an application specific integrated circuit (ASIC), a programmable logic device, or some other suitable type of hardware configured (e.g., preconfigured or reconfigured) to perform a number of operations. With a programmable logic device, for example, the device is configured to perform the number of operations and may be reconfigured at a later time. Examples of programmable logic devices include, a programmable logic array, a field programmable logic array, a field programmable gate array (FPGA), and other suitable hardware devices. With this type of implementation, executable instructions (e.g., program code 918) may be implemented as hardware, e.g., by specifying an FPGA configuration using a hardware description language (HDL) and then using a resulting binary file to (re)configure the FPGA.

In another example, data processing system 900 may be implemented as an FPGA-based (or in some cases ASIC-based), dedicated-purpose set of state machines (e.g., Finite State Machines (FSM)), which may allow critical tasks to be isolated and run on custom hardware. Whereas a processor such as a CPU can be described as a shared-use, general purpose state machine that executes instructions provided to it, FPGA-based state machine(s) are constructed for a special purpose, and may execute hardware-coded logic without sharing resources. Such systems are often utilized for safety-related and mission-critical tasks.

In still another illustrative example, processor unit 904 may be implemented using a combination of processors found in computers and hardware units. Processor unit 904 may have a number of hardware units and a number of processors that are configured to run program code 918. With this depicted example, some of the processes may be implemented in the number of hardware units, while other processes may be implemented in the number of processors.

In another example, system bus 902 may comprise one or more buses, such as a system bus or an input/output bus. Of course, the bus system may be implemented using any suitable type of architecture that provides for a transfer of data between different components or devices attached to the bus system. System bus 902 may include several types of bus structure(s) including memory bus or memory controller, a peripheral bus or external bus, and/or a local bus using any variety of available bus architectures (e.g., Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI)).

Additionally, communications unit 910 may include a number of devices that transmit data, receive data, or both transmit and receive data. Communications unit 910 may be, for example, a modem or a network adapter, two network adapters, or some combination thereof. Further, a memory may be, for example, memory 906, or a cache, such as that found in an interface and memory controller hub that may be present in system bus 902.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

H. Illustrative Combinations and Additional Examples

This section describes additional aspects and features of fastener determination systems and methods, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A0. A method for fastening two parts together comprising, prior to joining a first part with a second part, obtaining dimensions of the first part and the second part at respective fastener locations forming an assembly fastener location of an assembly of the first part joined with the second part where the first part is to be fastened to the second part by an assembled fastener; determining, based on the dimensions of the first and second parts at the respective fastener locations, a part stackup dimension for the assembled fastener at the assembly fastener location including a first dimension of the first part and a second dimension of the second part; obtaining dimensions of each of a plurality of different fastener components available for use in the assembled fastener; obtaining criteria defining characteristics of an assembly stackup including the first and second parts and the assembled fastener; and determining a defined fastener satisfying the criteria and having fastener components selected from the plurality of different fastener components.

A1. The method of paragraph A0, further comprising generating a virtual fit between the first and second parts based on the obtained dimensions of the first and second parts.

A2. The method of paragraph A1, further comprising determining, based on the virtual fit, dimensions of one or more shims to be positioned at the assembly fastener location, and wherein determining the part stackup dimension includes determining the part stackup dimension further including the dimension of the one or more shims.

A3. The method of paragraph A2, further comprising positioning the first part relative to the second part with the respective fastener locations of the first part and the second part aligned, and installing at the assembly fastener location the one or more shims having the determined dimensions.

A4. The method of paragraph A3, further comprising installing the defined fastener at the assembly fastener location.

A5. The method of any one of paragraphs A0 through A4, wherein the fastener components of the defined fastener include a bolt having a threaded portion and an unthreaded grip portion, the assembly stackup includes a bore extending through the first and second parts, and a first one of the criteria is that the threaded portion of the bolt is positioned entirely externally of the bore.

A6. The method of paragraph A5, wherein the fastener components of the defined fastener further include a nut threadedly mounted to the bolt, and a second one of the criteria is that the threaded portion of the bolt extend beyond the nut distally of the unthreaded portion by at least a first amount.

A7. The method of paragraph A6, wherein a third one of the criteria is that the threaded portion of the bolt extend beyond the nut distally of the unthreaded portion by less than a second amount.

A8. The method of any one of paragraphs A0 through A4, wherein the fastener components of the defined fastener include a bolt and a sleeve positioned around a shank of the bolt.

A9. The method of any one of paragraphs A0 through A8, wherein obtaining dimensions of the first part and the second part at the respective fastener locations includes measuring the first and second parts using at least one electronic sensor.

A10. The method of paragraph A9, wherein the at least one electronic sensor includes at least one laser scanner, and measuring the first and second parts includes scanning the first and second parts at the respective fastener locations using the at least one laser scanner.

A11. The method of any one of paragraphs A0 through A8, wherein obtaining dimensions of the first part and the second part at the respective fastener locations includes obtaining nominal parameters for the first and second parts and tolerances of the assembled fastener.

A12. The method of any one of paragraphs A0 through A11, wherein obtaining dimensions of the first part and the second part at respective fastener locations includes obtaining dimensions of the first part and the second part, obtaining information specifying the respective fastener locations on the first part and the second part, and determining the dimensions of the first part and the second part at the respective fastener locations from the dimensions of the first part and the second part and the information specifying the respective fastener locations.

A13. The method of paragraph A12, wherein obtaining dimensions of the first part and the second part includes receiving data defining design dimensions and manufacturing tolerances of the first part and the second part.

A14. The method of any one of paragraphs A0 through A13, further comprising generating a diagram illustrating a structure of the assembly of the first and second parts, and identifying on the diagram the assembly fastener location and indicia identifying the defined fastener.

B0. A data processing system for identifying fastener components, comprising one or more processors; a memory including one or more digital storage devices; and a plurality of instructions stored in the memory and executable by the one or more processors to: store data representing dimensions of a first part and a second part at respective fastener locations forming an assembly fastener location of an assembly of the first part joined with the second part where the first part is to be fastened to the second part by an assembled fastener; determine, based on the stored data, a part stackup dimension for the assembled fastener at the assembly fastener location including a first dimension of the first part and a second dimension of the second part; identify dimensions of each of a plurality of different fastener components available for use in the assembled fastener; receive criteria defining characteristics of an assembly stackup at the respective fastener locations on the first part and the second part including the first and second parts and the assembled fastener; and determine a defined fastener satisfying the criteria and having fastener components selected from the plurality of different fastener components.

B1. The system of paragraph B0, wherein the plurality of instructions is further executable by the one or more processors to generate a virtual fit between the first and second parts based on the dimensions of the first and second parts.

B2. The system of paragraph B1, wherein the plurality of instructions is further executable by the one or more processors to determine, based on the virtual fit, dimensions of one or more shims to be positioned at the fastener location, and wherein determining the part stackup dimension includes determining the part stackup dimension further including the dimension of the one or more shims.

B3. The system of any one of paragraphs B0 through B2, wherein the fastener components of the defined fastener include a bolt having a threaded portion and an unthreaded grip portion, the assembly stackup includes a bore extending through the first and second parts, and a first one of the criteria is that the threaded portion of the bolt is positioned entirely externally of the bore.

B4. The system of paragraph B3, wherein the fastener components of the defined fastener further include a nut threadedly mounted to the bolt, and a second one of the criteria is that the threaded portion of the bolt extend beyond the nut by at least a first amount.

B5. The system of paragraph B4, wherein a third one of the criteria is that the threaded portion of the bolt extend beyond the nut by less than a second amount.

B6. The system of any one of paragraphs B0 through B5, wherein identifying dimensions of each of a plurality of different fastener components available for use in the assembled fastener includes receiving data representing the dimensions of the plurality of different fastener components from a database including data associated with the different fastener components.

B7. The system of any one of paragraphs B0 through B6, wherein obtaining criteria defining characteristics of an assembly stackup includes receiving user-input criteria.

B8. The system of any one of paragraphs B0 through B7, further comprising an electronic sensing device coupled to at least one of the one or more processors and configured to measure dimensions, and wherein the plurality of instructions is further executable by the one or more processors to cause the electronic sensing device to measure information associated with the dimensions of the first and second parts, and receiving the data representing dimensions of the first and second parts includes receiving the measured information from the electronic sensing device.

C0. A computer program product for defining a fastener, the computer program product comprising a non-transitory computer-readable storage medium having computer-readable program code embodied therewith, the computer-readable program code configured to cause a data processing system to define the fastener, the computer-readable program code comprising at least one instruction to store data representing dimensions of a first part and a second part at respective fastener locations forming an assembly fastener location of an assembly of the first part joined with the second part where the first part is to be fastened to the second part by an assembled fastener; at least one instruction to determine, based on the stored data, a part stackup dimension for the assembled fastener including a first dimension of the first part and a second dimension of the second part; at least one instruction to identify dimensions of each of a plurality of different fastener components available for use in the assembled fastener; at least one instruction to receive criteria defining characteristics of an assembly stackup at the respective fastener locations on the first part and the second part including the first and second parts and the assembled fastener; and at least one instruction to determine a defined fastener satisfying the criteria and having fastener components selected from the plurality of different fastener components.

C1. The computer program product of paragraph C0, the computer-readable program code further including at least one instruction to generate a virtual fit between the first and second parts based on the dimensions of the first and second parts.

C2. The computer program product of paragraph C1, the computer-readable program code further including at least one instruction to determine, based on the virtual fit, dimensions of one or more shims to be positioned at the fastener location, and wherein the at least one instruction to determine the part stackup dimension includes at least one instruction to determine the part stackup dimension further including the dimension of the one or more shims.

C3. The computer program product of any one of paragraphs C0 through C2, wherein the fastener components of the defined fastener include a bolt having a threaded portion and an unthreaded grip portion, the assembly stackup includes a bore extending through the first and second parts, and a first one of the criteria is that the threaded portion of the bolt is positioned entirely externally of the bore.

C4. The computer program product of paragraph C3, wherein the fastener components of the defined fastener further include a nut threadedly mounted to the bolt, and a second one of the criteria is that the threaded portion of the bolt extend beyond the nut by at least a first amount.

C5. The computer program product of paragraph C4, wherein a third one of the criteria is that the threaded portion of the bolt extend beyond the nut by less than a second amount.

C6. The computer program product of any one of paragraphs C0 through C5, wherein the at least one instruction to identify dimensions of each of a plurality of different fastener components available for use in the assembled fastener includes at least one instruction to receive data representing the dimensions of the plurality of different fastener components from a database of fastener components.

C7. The computer program product of any one of paragraphs C0 through C6, wherein the at least one instruction to obtain criteria defining characteristics of an assembly stackup includes at least one instruction to receive user-input criteria defining characteristics of the assembly stackup.

D0. A method of defining fasteners for joining parts of an aircraft, the method comprising measuring locations of a first set of features of a first aircraft part; measuring locations of a second set of features of a second aircraft part; generating a virtual fit between the first and second aircraft parts based on the measured locations; and determining, based on the virtual fit, characteristics of one or more fasteners to secure the first aircraft part to the second aircraft part at respective fastener sites within the first and second aircraft parts.

D1. The method of paragraph D0, further comprising, prior to determining the characteristics of the fasteners, modifying the virtual fit with one or more shims to be positioned between the first and second aircraft parts.

D2. The method of paragraph D1, wherein the fasteners include at least one bolt, and the characteristics of the fasteners include a length of a grip of the at least one bolt.

D3. The method of any one of paragraphs D1 through D2, further comprising positioning the first aircraft part relative to the second aircraft part with the respective fastener sites of the first aircraft part and the second aircraft part aligned, and positioning the one or more shims between the first and second aircraft parts.

D4. The method of paragraph D3, further comprising installing the one or more fasteners at the aligned respective fastener sites of the first and second aircraft parts.

D5. The method of any one of paragraphs D0 through D4, wherein determining the characteristics of the one or more fasteners includes determining criteria defining the characteristics of the one or more fasteners.

D6. The method of paragraph D5, wherein the fasteners include at least one bolt having a threaded portion and an unthreaded grip portion, the respective fastener sites of the first aircraft part and the second aircraft part each include respective bores extending through the respective aircraft parts, and a first one of the criteria is that the threaded portion of the bolt is positioned entirely externally of the bores.

D7. The method of paragraph D6, wherein a nut is threadedly mounted to the at least one bolt, and a second one of the criteria is that the threaded portion of the bolt extend beyond the nut by at least a first amount.

D8. The method of paragraph D7, wherein a third one of the criteria is that the threaded portion of the bolt extend beyond the nut by less than a second amount.

D9. The method of any one of paragraphs D0 through D5, wherein the one or more fasteners include a bolt and a sleeve positioned around a shank of the bolt.

D10. The method of any one of paragraphs D0 through D9, wherein measuring the locations of the first and second sets of features includes measuring the locations of the first and second sets of features using at least one electronic sensor.

D11. The method of paragraph D10, wherein the at least one electronic sensor includes at least one laser scanner, and measuring the locations includes scanning the first and second aircraft parts using the at least one laser scanner.

D12. The method of any one of paragraphs D0 through D11, further comprising generating a diagram illustrating a structure of the first and second aircraft parts positioned with the respective fastener sites of the first and second aircraft parts aligned, and identifying on the diagram the aligned fastener sites.

D13. The method of any one of paragraphs D0 through D12, wherein the first aircraft part is an aircraft fuselage and the second aircraft part is an aircraft wing.

Advantages, Features, and Benefits

The different embodiments and examples of the fastener prediction systems and methods described herein provide several advantages over known solutions for determining which fasteners and/or fastener components to use to fasten parts together at specific assembly fastener locations. For example, illustrative embodiments and examples described herein allow appropriate fastener components to be determined prior to individually measuring dimensions of each assembly fastener location. Accordingly, illustrative embodiments and examples herein greatly speed up the process of assembling parts by installing fasteners at a plurality of assembly fastener locations. Additionally, depending on the accuracy of the part dimensions used, a mechanic installing the fasteners may not need to have the equipment and skills necessary to accurately measure the dimensions of each assembly fastener location.

Additionally, and among other benefits, illustrative embodiments and examples described herein allow assembly of a fastener kit that includes only those fastener components determined to be appropriate for each specific assembly fastener location on the parts to be joined. Accordingly, a mechanic joining the parts does not need to carry and/or have access to a wider variety of fastener components.

Additionally, and among other benefits, illustrative embodiments and examples described herein allow suitable fasteners for joining two parts to be determined prior to positioning the two parts relative to each other. Accordingly, illustrative embodiments and examples described herein prevent an inconvenient situation wherein the parts have been positioned together but suitable fasteners are not readily accessible.

No known system or device can perform these functions. However, not all embodiments and examples described herein provide the same advantages or the same degree of advantage.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A method for fastening two parts together comprising, prior to joining a first part with a second part:
obtaining dimensions of the first part and the second part at respective fastener locations forming an assembly fastener location of an assembly of the first part joined with the second part where the first part is to be fastened to the second part by an assembled fastener, wherein obtaining dimensions of the first part and the second part includes measuring the first and second parts using at least one electronic sensor;
determining, based on the dimensions of the first and second parts at the respective fastener locations, a part stackup dimension for the assembled fastener at the assembly fastener location including a first dimension of the first part and a second dimension of the second part;
obtaining dimensions of each of a plurality of different fastener components available for use in the assembled fastener, wherein the plurality of different fastener components includes a plurality of bolts, wherein each bolt has a threaded portion and an unthreaded grip portion, and wherein each unthreaded grip portion of the plurality of bolts has a different predefined length;
obtaining criteria defining characteristics of an assembly stackup including the first and second parts and the assembled fastener, the criteria including a maximum length and a minimum length of an unthreaded grip portion for a bolt of the assembled fastener; and
determining a defined fastener satisfying the criteria and having fastener components selected from the plurality of different fastener components and including a bolt of the plurality of bolts for which the predefined different length is in a range defined by the maximum and minimum lengths.

2. The method of claim 1, further comprising generating a virtual fit between the first and second parts based on the obtained dimensions of the first and second parts.

3. The method of claim 2, further comprising determining, based on the virtual fit, dimensions of one or more shims to be positioned at the assembly fastener location, and wherein determining the part stackup dimension includes determining the part stackup dimension further including the dimension of the one or more shims.

4. The method of claim 3, further comprising positioning the first part relative to the second part with the respective fastener locations of the first part and the second part aligned, and installing at the assembly fastener location the one or more shims having the determined dimensions.

5. The method of claim 4, further comprising installing the defined fastener at the assembly fastener location.

6. The method of claim 1, wherein the assembly stackup includes a bore extending through the first and second parts, and wherein one of the criteria is that the threaded portion of the bolt of the defined fastener is positioned entirely externally of the bore.

7. The method of claim 1, wherein the fastener components of the defined fastener include a sleeve positioned around a shank of the bolt.

8. The method of claim 1, wherein obtaining dimensions of the first part and the second part at respective fastener locations includes obtaining dimensions of the first part and the second part, obtaining information specifying the respective fastener locations on the first part and the second part, and determining the dimensions of the first part and the second part at the respective fastener locations from the dimensions of the first part and the second part and the information specifying the respective fastener locations.

9. The method of claim 1, further comprising generating a diagram illustrating a structure of the assembly of the first and second parts, and identifying on the diagram the assembly fastener location and indicia identifying the defined fastener.

10. The method of claim 1, wherein the first part is a first aircraft part and the second part is a second aircraft part.

11. The method of claim 10, wherein the first aircraft part is an aircraft fuselage and the second aircraft part is an aircraft wing.

12. The method of claim 1, wherein the at least one electronic sensor includes at least one laser scanner, and wherein measuring the first and second parts includes scanning the first and second parts using the at least one laser scanner.

13. The method of claim 1, wherein the fastener components of the defined fastener include a nut threadedly mounted to the bolt, and wherein one of the criteria is that the threaded portion of the bolt extends beyond the nut by at least a first amount.

14. The method of claim 13, wherein another one of the criteria is that the threaded portion of the bolt extends beyond the nut by less than a second amount.

15. A data processing system for identifying fastener components, comprising:
one or more processors;
a memory including one or more digital storage devices; and
a plurality of instructions stored in the memory and executable by the one or more processors to:
store data representing dimensions of a first part and a second part at respective fastener locations forming an assembly fastener location of an assembly of the first part joined with the second part where the first part is to be fastened to the second part by an assembled fastener, wherein the dimensions are obtained by measuring the first and second parts using at least one electronic sensor;
determine, based on the stored data, a part stackup dimension for the assembled fastener at the assembly fastener location including a first dimension of the first part and a second dimension of the second part;
identify dimensions of each of a plurality of different fastener components available for use in the assembled fastener, wherein the plurality of different fastener components includes a plurality of bolts, wherein each bolt has a threaded portion and an unthreaded grip portion, and wherein each unthreaded grip portion of the plurality of bolts has a different predefined length;
receive criteria defining characteristics of an assembly stackup including the first and second parts and the assembled fastener, the criteria including a maximum length and a minimum length of an unthreaded grip portion for a bolt of the assembled fastener; and
determine a defined fastener satisfying the criteria and having fastener components selected from the plurality of different fastener components and including a bolt of the plurality of bolts for which the predefined different length is in a range defined by the maximum and minimum lengths.

16. The system of claim 15, wherein the plurality of instructions is further executable by the one or more processors to generate a virtual fit between the first and second parts based on the dimensions of the first and second parts.

17. The system of claim 16, wherein the plurality of instructions is further executable by the one or more processors to determine, based on the virtual fit, dimensions of one or more shims to be positioned at the assembly fastener location, and wherein determining the part stackup dimension includes determining the part stackup dimension further including the dimension of the one or more shims.

18. The system of claim 15, wherein the assembly stackup includes a bore extending through the first and second parts, and wherein one of the criteria is that the threaded portion of the bolt of the defined fastener is positioned entirely externally of the bore.

19. The system of claim 15, further comprising the least one electronic sensor coupled to at least one of the one or more processors, and wherein the plurality of instructions is further executable by the one or more processors to cause the at least one electronic sensor to measure information associated with the dimensions of the first and second parts, and receiving the data representing dimensions of the first and second parts includes receiving the measured information from the at least one electronic sensor.

20. The system of claim 15, wherein the first part is a first aircraft part and the second part is a second aircraft part.

* * * * *